United States Patent
Kanzaki et al.

(10) Patent No.: US 12,453,694 B2
(45) Date of Patent: *Oct. 28, 2025

(54) COSMETIC COMPOSITION

(71) Applicant: DOW TORAY CO., LTD., Tokyo (JP)

(72) Inventors: Yasue Kanzaki, Ichihara (JP); Sayuri Kikunaga, Ichihara (JP); Son Thanh Phan, Ichihara (JP); Jun Miyano, Tokyo (JP); Seiji Hori, Ichihara (JP)

(73) Assignee: DOW TORAY CO., LTD., Tokyo (JP)

( * ) Notice: Subject to any disclaimer, the term of this patent is extended or adjusted under 35 U.S.C. 154(b) by 816 days.

This patent is subject to a terminal disclaimer.

(21) Appl. No.: 17/604,821

(22) PCT Filed: Jul. 31, 2019

(86) PCT No.: PCT/JP2019/029957
§ 371 (c)(1),
(2) Date: Oct. 19, 2021

(87) PCT Pub. No.: WO2020/217556
PCT Pub. Date: Oct. 29, 2020

(65) Prior Publication Data
US 2022/0257497 A1    Aug. 18, 2022

(30) Foreign Application Priority Data
Apr. 24, 2019   (JP) ................... 2019-082560

(51) Int. Cl.
*A61K 8/891* (2006.01)
*A61K 8/04* (2006.01)
*A61K 8/27* (2006.01)
*A61K 8/29* (2006.01)
*A61Q 17/04* (2006.01)

(52) U.S. Cl.
CPC .......... *A61K 8/891* (2013.01); *A61K 8/044* (2013.01); *A61K 8/27* (2013.01); *A61K 8/29* (2013.01); *A61Q 17/04* (2013.01); *A61K 2800/412* (2013.01); *A61K 2800/48* (2013.01)

(58) Field of Classification Search
None
See application file for complete search history.

(56) References Cited

U.S. PATENT DOCUMENTS

| | | |
|---|---|---|
| 4,501,619 A | 2/1985 | Gee |
| 4,744,978 A | 5/1988 | Homan et al. |
| 4,844,888 A | 7/1989 | Zawadzki |
| 4,980,167 A | 12/1990 | Harashima et al. |
| 5,596,061 A | 1/1997 | Berger et al. |
| 5,628,989 A | 5/1997 | Harashima et al. |
| 5,643,380 A | 7/1997 | Saitoh et al. |
| 5,939,478 A | 8/1999 | Beck et al. |
| 5,948,391 A | 9/1999 | O'Lenick, Jr. |
| 6,238,656 B1 | 5/2001 | Morita et al. |
| 6,290,941 B1 | 9/2001 | Lahanas et al. |
| 6,342,209 B1 | 1/2002 | Patil et al. |
| 6,384,104 B1 | 5/2002 | Chang et al. |
| 7,981,405 B2 | 7/2011 | Ueyama et al. |
| 8,500,900 B2 | 8/2013 | Sugiura et al. |
| 8,900,553 B2 | 12/2014 | Tamarkin et al. |
| 8,956,449 B2 | 2/2015 | Kojima et al. |
| 9,486,652 B2 | 11/2016 | Araki et al. |
| 10,130,579 B2 | 11/2018 | Kanaya et al. |
| 12,023,403 B2 | 7/2024 | Kanzaki et al. |
| 2002/0031488 A1 | 3/2002 | Kanji et al. |
| 2003/0212232 A1 | 11/2003 | Majeti et al. |
| 2009/0253885 A1 | 10/2009 | Kamei |
| 2010/0189676 A1 | 7/2010 | Matsuzawa et al. |
| 2010/0190871 A1 | 7/2010 | Araki et al. |
| 2010/0216744 A1 | 8/2010 | Mizutani et al. |
| 2010/0317555 A1 | 12/2010 | Araki et al. |
| 2011/0182846 A1 | 7/2011 | Ikeda et al. |

(Continued)

FOREIGN PATENT DOCUMENTS

| | | |
|---|---|---|
| CN | 104125973 A | 10/2014 |
| EP | 2997956 A1 | 3/2016 |

(Continued)

OTHER PUBLICATIONS

PCT/JP2015/060963 International Search Report dated Jul. 14, 2015, 2 pages.

English language abstract and machine translation for JPH0812524(A) extracted from http://worldwide.espacenet.com database on Oct. 25, 2016, 13 pages.

English language abstract and machine translation for JPH0812546 (A) extracted from http://worldwide.espacenet.com database on Oct. 25, 2016, 12 pages.

English language abstract and machine translation for JPH08109263 (A) extracted from http://worldwide.espacenet.com database on Oct. 25, 2016, 24 pages.

English language abstract and machine translation for JPH09241511 (A) extracted from http://worldwide.espacenet.com database on Oct. 25, 2016, 13 pages.

(Continued)

*Primary Examiner* — Craig D Ricci
*Assistant Examiner* — Paul Hoerner
(74) *Attorney, Agent, or Firm* — Warner Norcross + Judd LLP

(57) ABSTRACT

Provided is a cosmetic composition with excellent storage stability, feel during use and ultraviolet light blocking effects, in which an inorganic ultraviolet light blocking agent comprising a hydrophobic fine particulate metal oxide, e.g., hydrophobic fine particulate zinc oxide can be uniformly and stably dispersed in an aqueous phase, and in which a reduction in viscosity of a formulation is suppressed even when the structure of the hydrophobic fine particulate metal oxide is dispersed in the aqueous phase. The cosmetic composition comprises (A) a carboxylic acid modified silicone having a specific structure, (B) a water-soluble thickening agent, (C) a basic compound, and (D) a hydrophobic fine particulate metal oxide. The cosmetic composition is useful as a sunscreen cosmetic composition.

9 Claims, No Drawings

(56) References Cited

U.S. PATENT DOCUMENTS

| | | |
|---|---|---|
| 2012/0040931 A1 | 2/2012 | Kamei |
| 2012/0251605 A1 | 10/2012 | Iimura et al. |
| 2012/0263662 A1 | 10/2012 | Iimura et al. |
| 2014/0199251 A1 | 7/2014 | Ashida et al. |
| 2014/0235732 A1 | 8/2014 | Ibe et al. |
| 2014/0255323 A1 | 9/2014 | Ishida et al. |
| 2014/0348765 A1 | 11/2014 | Sasaki |
| 2015/0011656 A1 | 1/2015 | Tamura et al. |
| 2015/0157546 A1 | 6/2015 | Naoi |
| 2015/0174054 A1 | 6/2015 | Chiou et al. |
| 2015/0216787 A1 | 8/2015 | Hori et al. |
| 2015/0232601 A1 | 8/2015 | Furukawa et al. |
| 2016/0120786 A1 | 5/2016 | Halpern Chirch et al. |
| 2017/0035681 A1* | 2/2017 | Kanaya ................ A61Q 1/00 |
| 2017/0304658 A1* | 10/2017 | Roudot ................ A61K 8/25 |
| 2018/0215877 A1 | 8/2018 | Hori et al. |
| 2018/0263883 A1 | 9/2018 | Uyama et al. |
| 2019/0053999 A1 | 2/2019 | Hori et al. |
| 2019/0144612 A1 | 5/2019 | Hori et al. |
| 2019/0231674 A1 | 8/2019 | Furukawa et al. |
| 2021/0244641 A1 | 8/2021 | Kondo et al. |
| 2021/0322296 A1 | 10/2021 | Kikunaga et al. |
| 2021/0330559 A1 | 10/2021 | Kondo et al. |
| 2021/0330571 A1 | 10/2021 | Kanzaki et al. |
| 2022/0183955 A1 | 6/2022 | Kondo et al. |
| 2022/0183956 A1 | 6/2022 | Kondo et al. |
| 2022/0257497 A1 | 8/2022 | Kanzaki et al. |

FOREIGN PATENT DOCUMENTS

| | | |
|---|---|---|
| EP | 3132789 A1 | 2/2017 |
| EP | 3213742 A1 | 9/2017 |
| EP | 3327064 A1 | 5/2018 |
| EP | 3838249 A1 | 6/2021 |
| EP | 3838255 A1 | 6/2021 |
| EP | 3838256 A1 | 6/2021 |
| JP | S62103007 A | 5/1987 |
| JP | H01261316 A | 10/1989 |
| JP | H02243612 A | 9/1990 |
| JP | H0812524 A | 1/1996 |
| JP | H0812545 A | 1/1996 |
| JP | H0812546 A | 1/1996 |
| JP | H0844260 A | 2/1996 |
| JP | H08109263 A | 4/1996 |
| JP | H08157335 A | 6/1996 |
| JP | H0959125 A | 3/1997 |
| JP | H09241511 A | 9/1997 |
| JP | H1143417 A | 2/1999 |
| JP | H11504665 A | 4/1999 |
| JP | H11193331 A | 7/1999 |
| JP | 2000281523 A | 10/2000 |
| JP | 2001172463 A | 6/2001 |
| JP | 2002114849 A | 4/2002 |
| JP | 2002146188 A | 5/2002 |
| JP | 2002146189 A | 5/2002 |
| JP | 2002275265 A | 9/2002 |
| JP | 2002293726 A | 10/2002 |
| JP | 2002322015 A | 11/2002 |
| JP | 2004026669 A | 1/2004 |
| JP | 2004091423 A | 3/2004 |
| JP | 2005524747 A | 8/2005 |
| JP | 2007277415 A | 10/2007 |
| JP | 2009185144 A | 8/2009 |
| JP | 2009263643 A | 11/2009 |
| JP | 2010138074 A | 6/2010 |
| JP | 2011073971 A | 4/2011 |
| JP | 2011148784 A | 8/2011 |
| JP | 2011149017 A | 8/2011 |
| JP | 2012036348 A | 2/2012 |
| JP | 2013121947 A | 6/2013 |
| JP | 2013144655 A | 7/2013 |
| JP | 2013177370 A | 9/2013 |
| JP | 2014040511 A | 3/2014 |
| JP | 2014040512 A | 3/2014 |
| JP | 2014201569 A | 10/2014 |
| JP | 2015203026 A | 11/2015 |
| JP | 2016185932 A | 10/2016 |
| JP | 2017178930 A | 10/2017 |
| JP | 2018024881 | 2/2018 |
| JP | 2018115211 A | 7/2018 |
| WO | 1995023579 A2 | 9/1995 |
| WO | 2009022621 A1 | 2/2009 |
| WO | 2009025146 A1 | 2/2009 |
| WO | 2012070309 A1 | 5/2012 |
| WO | 2013061776 A1 | 5/2013 |
| WO | 2013100177 A1 | 7/2013 |
| WO | 2013108515 A1 | 7/2013 |
| WO | 2013115099 A1 | 8/2013 |
| WO | 2014185316 A1 | 11/2014 |
| WO | 2015125332 A1 | 8/2015 |
| WO | 2017018358 A1 | 2/2017 |
| WO | 2017061090 A1 | 4/2017 |
| WO | 2017191798 A1 | 11/2017 |
| WO | 2018066559 A1 | 4/2018 |
| WO | 2020036061 A1 | 2/2020 |
| WO | 2020036062 A1 | 2/2020 |
| WO | 2020036063 A1 | 2/2020 |
| WO | 2020036064 A1 | 2/2020 |
| WO | 2020036065 A1 | 2/2020 |

OTHER PUBLICATIONS

English language abstract and machine translation for JP2002114849 (A) extracted from http://worldwide.espacenet.com database on Oct. 25, 2016, 10 pages.

English language abstract and machine translation for JP2004026669 (A) extracted from http://worldwide.espacenet.com database on Oct. 25, 2016, 12 pages.

Machine assisted English translation of WO2012070309A1 obtained from https://patents.google.com/patent on Aug. 8, 2024, 8 pages.

K. Kageshima et al., Fragrance Journal, Special Issue Nov. 19, 2005, p. 125-130.

English language abstract for JP2010138074 (A) extracted from http://worldwide.espacenet.com database on Oct. 25, 2016 and machine translation extracted from https://patents.google.com database on Jan. 13, 2017, 20 pages.

English language abstract and machine translation for JP2007277415 (A) extracted from http://worldwide.espacenet.com database on Jun. 4, 2018, 29 pages.

Machine assisted English translation of JP2000281523A obtained from <https://patents.google.com/patent> on Aug. 8, 2024, 16 pages.

English translation of International Search Report for PCT/JP2019/029957 dated Oct. 8, 2019, 2 pages.

Momentive: "Silform INX fluid", Internet Citation, Feb. 2, 2015 (Feb. 2, 2015), XP002785508, Retrieved from the Internet: URL:http://www.essentialingredients.com/pdf/SilFormINXmarketingbrochure.pdf.

Database GNPD [Online] Mintel; Oct. 29, 2012 (Oct. 29, 2012), anonymous: "Cream+", XP055907992, Database accession No. 1900229.

Database GNPD [Online] Mintel; Apr. 22, 2016 (Apr. 22, 2016), anonymous: "Ultra Sun Protection Cream SPF 50+", XP055908000, Database accession No. 3945269.

Database GNPD [Online] Mintel; Apr. 26, 2010 (Apr. 26, 2010), anonymous: "Skin Empowering Cream", XP055907993, Database accession No. 1323504.

Database GNPD [Online] Mintel; Jan. 28, 2019 (Jan. 28, 2019), anonymous: "Wrinkle Resetter", XP055907996, Database accession No. 6296569.

English Translation of International Search Report for PCT/JP2019/029956, dated Oct. 8, 2019, 2 pages.

Momentive "SilForm? INX Fluid"—Marketing Bulletin, obtained from https://www.momentive.com/docs/default-source/productdocuments/siliform-inx-fluid/silform-inx-fluid-marketing-bulletin-(1).20956cf16e974c2d9a951e587eee27dc.pdf , 12 pages 2017.

English Translation of International Search Report for PCT/JP2019/029937, dated Oct. 21, 2019, 2 pages.

English Translation of International Search Report for PCT/JP2019/029930, dated Oct. 15, 2019, 2 pages.

(56) References Cited

OTHER PUBLICATIONS

English Translation of International Search Report for PCT/JP2019/029958, dated Oct. 15, 2019, 1 page.
English Translation of International Search Report for PCT/JP2019/029935, dated Oct. 15, 2019, 2 pages.
International Search Report for PCT/JP2019/029927 dated Oct. 15, 2019, 2 pages.
Machine assisted English Translation of JP2002275265A obtained from https://worldwide.espacenet.com on May 2, 2024, 20 pages.
Machine assisted English Translation of JPH01261316 obtained from https://worldwide.espacenet.com on May 3, 2021, 8 pages.
Machine assisted English Translation of JPH1143417 obtained from https://worldwide.espacenet.com on May 4, 2021, 13 pages.
Machine assisted English Translation of JP2013177370 obtained from https://worldwide.espacenet.com on May 3, 2021, 18 pages.
Machine assisted English Translation of JP2014201569 obtained from https://worldwide.espacenet.com on May 3, 2021, 25 pages.
Machine assisted English Translation of JP2018115211 obtained from https://worldwide.espacenet.com on May 3, 2021, 41 pages.
Machine assisted English Translation of WO2013115099 obtained from https://worldwide.espacenet.com on May 3, 2021, 36 pages.
Machine assisted English translation of JP2002146189A obtained from https://patents.google.com/patent on May 26, 2022, 11 pages.
Momentive "SilForm™ INX Fluid"—Marketing Bulletin, obtained from https://www.momentive.com/docs/default-source/productdocuments/silform-inx-fluid/silform-inx-fluid-marketing-bulletin-(1)20956cf16e974c2d9a951e587eee27dc.pdf, 12 pages.
Cassiday www.aocs.org/stay-informed/inform-magazine/featured-articles/emulsions-making-oil-and-water-mix-april2014?SSO=True# (Year: 2014).
Machine assisted English translation of JP2017178930A obtained from https://patents.google.com/patent on Oct. 26, 2021, 11 pages.
Machine assisted English translation of JP2016185932A obtained from https://patents.google.com/patent on Oct. 26, 2021, 12 pages.
Machine assisted English translation of WO2015125332A1 obtained from https://patents.google.com/patent on Oct. 26, 2021, 11 pages.
Machine assisted English Translation of JP2002146188A obtained from https://worldwide.espacenet.com on Dec. 11, 2023, 13 pages.
Machine assisted English Translation of JP2002322015A obtained from https://worldwide.espacenet.com on Dec. 11, 2023, 15 pages.
Machine assisted English translation of JP2002293726A obtained from https://patents.google.com/patent on Oct. 18, 2021, 11 pages.
Machine assisted English translation of JP2004091423A obtained from https://patents.google.com/patent on Oct. 18, 2021, 5 pages.
Machine assisted English translation of JP2011073971A obtained from https://patents.google.com/patent on Oct. 18, 2021, 9 pages.
Machine assisted English translation of JPH0959125A obtained from https://patents.google.com/patent on Nov. 25, 2024, 7 pages.

* cited by examiner

COSMETIC COMPOSITION

CROSS-REFERENCE TO RELATED APPLICATIONS

This application is the U.S. National Stage of International Application No. PCT/JP2019/029957 filed on 31 Jul. 2019, which claims priority to and all advantages of Japanese Application No. 2019-082560 filed on 24 Apr. 2019, the contents of which is incorporated herein by reference.

TECHNICAL FIELD

The present invention relates to a cosmetic composition with excellent storage stability, feel during use and ultraviolet light blocking effects, in which an inorganic ultraviolet light blocking agent containing a hydrophobic fine particulate metal oxide as represented by hydrophobic fine particulate zinc oxide can be uniformly and stably dispersed in an aqueous phase, and in which a reduction in viscosity of a formulation is suppressed even when the structure of the hydrophobic fine particulate metal oxide is dispersed in the aqueous phase.

BACKGROUND ART

Cosmetic compositions containing an aqueous phase as a continuous phase provide a fresh and refreshing feel during use, and therefore have been widely used as make-up cosmetic compositions such as base cosmetic compositions such as emulsions, foundation cosmetic compositions, sunscreen agents, foundations, eye shadows, and the like. In particular, an oil-in-water emulsion cosmetic composition containing an inorganic UV protecting agent typified by hydrophobic fine particulate titanium oxide and hydrophobic fine particulate zinc oxide can be designed to have a high SPF (=Sun Protection Factor) value, which is an index showing the degree of an effect of blocking UV-B waves (wavelength 280 to 315 nm) among ultraviolet rays, and thus has been widely used as a sunscreen cosmetic composition such as sunscreen.

Further, the oil-in-water emulsion cosmetic composition has a problem in that a cosmetic film obtained by applying the cosmetic composition is usually inferior in water resistance, and thus, for the purpose of imparting water resistance to the cosmetic film, Patent Document 1 proposes to compound a hydrophobic powder such as hydrophobic fine particulate titanium oxide and hydrophobic fine particulate zinc oxide. Furthermore, in Patent Document 2, it has been proposed to use carboxylic acid-modified silicone under alkaline conditions in order to favorably disperse the hydrophobic powder in the aqueous phase and stabilize the cosmetic composition.

On the other hand, in recent years, sunscreen cosmetic compositions with high UV protection property have been required, and the SPF value, which is an index, is dependent on the compounding amount of inorganic UV protecting agent such as hydrophobic fine particulate titanium oxide, hydrophobic fine particulate zinc oxide, and the like. Therefore, it is necessary to add a large amount of these inorganic powders to cosmetic compositions to achieve a high SPF value. However, when a large amount of these inorganic ultraviolet light blocking agents are added to an oil-in-water emulsion cosmetic composition, the feel during use peculiar to an oil-in-water emulsion cosmetic composition may be impaired, which may cause powdery feel or friction. Therefore, in order to achieve both the fresh and refreshing feel during use peculiar to oil-in-water emulsion cosmetic compositions and a high SPF value, while achieving film performance with high water resistance, in particular, improving ultraviolet blocking properties thereof (in particular, the SPF value), the present applicant has proposed an oil-in-water emulsion cosmetic composition combining a vinyl polymer emulsion and a carboxylic acid modified silicone, as described in Patent Document 3. Note that a technical problem of the invention is to improve ultraviolet light blocking properties (in particular, the SPF value) of the inorganic ultraviolet light blocking agent on the premise that the amount of the inorganic ultraviolet light blocking agent is controlled, and a main object thereof is not to provide a technical solution for increasing the blending amount of the inorganic ultraviolet light blocking agent in a formulation.

However, the documents 1 to 3 do not describe or suggest any effects of a water-soluble component (for example, metal cations ($M2+$)) in an aqueous phase derived from hydrophobic fine particulate titanium dioxide, hydrophobic fine particulate zinc oxide, and the like and effects thereof on a formulation.

PRIOR ART DOCUMENTS

Patent Documents

Patent Document 1: Japanese Unexamined Patent Application Publication No. 2004-91423
Patent Document 2: Japanese Unexamined Patent Application Publication No. 2015-203026
Patent Document 3: Japanese Patent Application 2018-152804 (unpublished at the time of filing)

SUMMARY OF THE INVENTION

Problems to be Solved by the Invention

On the other hand, the present applicant discovered a new problem with cosmetic compositions containing an inorganic ultraviolet light blocking component such as hydrophobic fine particulate titanium dioxide, hydrophobic fine particulate zinc oxide, or the like, and having a structure in which the inorganic ultraviolet light blocking components are dispersed in an aqueous phase.

In general, in order for a cosmetic composition having an aqueous phase as a continuous phase to achieve sufficient spreadability and feel during use when applied to the skin, suppress separation of each component serving as a formulation, maintain a uniform appearance, and improve storage stability, the overall viscosity of the cosmetic composition must be adjusted using a water-soluble thickening agent such as carboxyvinyl polymer (known by product names such as Carbomer) and the like.

Herein, as described above, while there is a trend toward the demand for a cosmetic composition with high ultraviolet light blocking properties, the SPF value, which is an indicator thereof, is dependent on the amount of an inorganic ultraviolet light blocking agent such as hydrophobic fine particulate titanium dioxide, hydrophobic fine particulate zinc oxide, and the like. The present applicant discovered that if the amount of dispersion of these hydrophobic fine particulate metal oxides in an aqueous phase is increased, even if a water-soluble thickening agent is used, the overall viscosity of a formulation is reduced, and the inorganic ultraviolet light blocking agent cannot be uniformly dispersed, and thus the desired storage stability, water resistance, ultraviolet light blocking performance, and the like cannot be achieved. This phenomenon is considered to be due to the influence of hydrophobic fine particulate metal oxides in an aqueous phase or a water-soluble component derived therefrom. In general, it is difficult to stably disperse a large amount of these inorganic ultraviolet light blocking agents in an aqueous phase, even if a water-soluble thickening agent such as a carboxyvinyl polymer or the like is used in combination. This is a serious obstacle in the design of cosmetic compositions.

In order to solve the aforementioned new problem, an object of the present invention is to provide a cosmetic composition in which a large amount of an inorganic ultraviolet light blocking agent can be stably dispersed in an aqueous phase, the storage stability and ultraviolet light blocking performance of the cosmetic composition are high, the texture and feel during use of the cosmetic composition are not impaired as much as possible, and the water resistance and the like of a film (cosmetic film) is excellent, because the influence of hydrophobic fine particulate metal oxides in an aqueous phase or a water-soluble component derived therefrom is suppressed, and a thickening effect based on a water-soluble thickening agent such as a carboxyvinyl polymer or the like is not impaired even if a large amount of an inorganic ultraviolet light blocking agent is added.

Means for Solving the Problems

As a result of extensive studies in order to solve the aforementioned problem, the present inventors discovered that the problem can be solved by a cosmetic composition containing an inorganic ultraviolet light blocking agent containing (A) a carboxylic acid modified silicone having a specific chain length and side chain modified structure, (B) a water-soluble thickening agent, (C) a basic compound, and (D) a hydrophobic fine particulate metal oxide, where component (D) has a structure dispersed in an aqueous phase, thereby achieving the present invention. In particular, by combining the aforementioned components (A) and (B) in a cosmetic composition containing hydrophobized fine particulate zinc oxide as component (D), it is possible to stably disperse an inorganic ultraviolet light blocking agent in an aqueous phase and achieve a cosmetic composition with excellent storage stability, high ultraviolet light blocking performance, appearance, feel during use, water resistance of a film (cosmetic film), and the like without causing adverse effects such as a reduction in the overall viscosity of the cosmetic product and the like.

In other words, an object of the present invention is achieved by:

[1] a cosmetic composition, containing:
(A) a carboxylic acid modified silicone that is liquid at room temperature (25° C.) as expressed by the following structural formula (1):

[Formula 1]

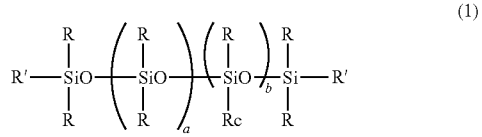

(1)

(Where
Rc represents an organic group containing a carboxyl group as expressed by general formula: —$R^1$—($OR^2$)p-(O)w-$R^3$—COOH, ($R^1$ represents a straight chain or branched alkylene group having 2 to 22 carbon atoms, $R^2$ represents a straight chain or branched alkylene group having 2 to 4 carbon atoms, $R^3$ represents a bond (-) or a straight chain or branched alkylene group having 1 to 22 carbon atoms, p represents a number from 0 to 200, and w represents a number of 0 or 1),
R represents the same or a different alkyl or alkoxy group, having 1 to 22 carbon atoms, or phenyl group,
R' is Rc or R, and
a and b each represent a positive number, a+b is a number within a range of 2 to 20, and a/b is within a range of 0.3 to 3.0.);
(B) a water-soluble thickening agent;
(C) a basic compound; and
(D) an inorganic ultraviolet light blocking agent containing a hydrophobic fine particulate metal oxide; where component (D) has a dispersed structure in an aqueous phase; and more preferably achieved by:

[2] the cosmetic composition according to [1], where the water-soluble thickening agent (component (B)) contains one or more types selected from:
(b1) carboxyvinyl polymers;
(b2) acrylic acid copolymers or salts thereof;
(b3) alkyl acrylate/methacrylate polyoxyethylene copolymers;
(b4) polyacrylam ides; and
(b5) water-soluble natural polysaccharide polymers.

An object of the present invention is more preferably achieved by the following cosmetic compositions.

[3] The cosmetic composition according to [1] or [2], wherein the inorganic ultraviolet light blocking agent (component (D)) contains:
(D1) a hydrophobized fine particulate titanium oxide or hydrophobized fine particulate zinc oxide with an average particle diameter within a range of 1 to 200 nm.

[4] The cosmetic composition according to any one of [1] to [3], wherein the inorganic ultraviolet light blocking agent (component (D)) contains at least:
(D1-1) a hydrophobized fine particulate zinc oxide with an average particle diameter within a range of 1 to 200 nm.

[5] The cosmetic composition according to any one of [1] to [4], wherein the inorganic ultraviolet light blocking agent (component (D)) is blended into the cosmetic composition in a form of a powder dispersion that has been mixed in advance with all or a portion of component (A).

[6] The cosmetic composition according to any one of [1] to [5], further containing:
(E) an oil agent.

[7] The cosmetic composition according to [6], wherein the oil agent (E) contains at least one type of ultraviolet light absorber.

[8] The cosmetic composition according any one of [1] to [7], which is an oil-in-water emulsified cosmetic composition.

[9] The cosmetic composition according to any one of [1] to [8], further comprising one or more substance selected from (F) oil-soluble film-forming agents, (G) alcohols, (H) water-soluble ultraviolet light absorbers, and (I) vinyl-based polymer emulsions.

[10] The cosmetic composition according any one of [1] to [9], which is a sunscreen cosmetic composition.

Effects of the Invention

The cosmetic composition of the present invention can provide a cosmetic composition in which a large amount of an inorganic ultraviolet light blocking agent can be stably dispersed in an aqueous phase, the storage stability and ultraviolet light blocking performance of the cosmetic composition are high, the texture and feel during use of the cosmetic composition are not impaired as much as possible, and the water resistance and the like of a film (cosmetic film) is excellent, because the influence of hydrophobic fine particulate metal oxides, such as hydrophobized fine particulate zinc oxides and the like, or a water-soluble component derived therefrom is suppressed, and a thickening effect based on a water-soluble thickening agent such as a carboxyvinyl polymer or the like is not impaired even if a large amount of an inorganic ultraviolet light blocking agent is added. Therefore, utilizing the present invention can provide a sunscreen cosmetic composition or the like that has an increased degree of freedom in formulation design, and has both performance such as water resistance and the like and the ultraviolet light blocking properties represented by the SPF value.

Furthermore, the cosmetic composition of the present invention has excellent stability and storage stability as a formulation from the perspective of maintaining a uniform appearance without phase separation occurring over time, and also significantly exhibits excellent water resistance of a film (cosmetic film).

In addition, since the cosmetic composition of the present invention contains the component (A) and the component (C), the formed cosmetic film has the advantage in that it can be easily removed by using normal soap and water.

PREFERRED MODE FOR CARRYING OUT THE INVENTION

Hereinafter, an oil-in-water emulsion cosmetic composition of the present invention will be described in detail.

One main technical effect of the present invention is that a carboxylic acid modified silicone (A) having a specific structure, a water-soluble thickening agent (B), and a basic compound (C) are combined in an oil-in-water emulsifying cosmetic composition containing an inorganic ultraviolet light blocking agent containing a hydrophobic fine particulate metal oxide (D), such that a large amount of the inorganic ultraviolet light blocking agent can be stably and uniformly dispersed in an aqueous phase by suppressing an influence of the inorganic ultraviolet light blocking agent, which is a hydrophobic fine particulate metal oxide, in an aqueous phase and a water-soluble component derived therefrom, and such that problems such as a reduction in viscosity of the cosmetic composition and the like are less likely to occur.

[(A) Carboxylic Acid-Modified Silicone]

The cosmetic composition of the present invention contains at least one carboxylic acid modified silicone (A) that is liquid at room temperature (25° C.) and has a specific chemical structure. Note that the carboxylic acid modified silicone (A) is preferably liquid at room temperature (25° C.) and at 1 atmosphere. This is because the carboxylic acid modified silicone that is liquid at room temperature (25° C.) has a strong function as a surfactant and is easy to mix with water and a water-soluble thickening agent serving as component (B).

The carboxylic acid modified silicone (A) is expressed by the following structural formula (1):

[Formula 2]

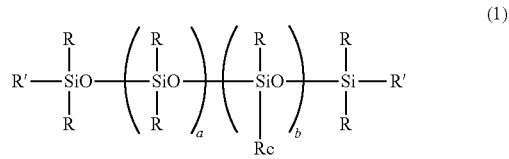

(Where
Rc represents an organic group containing a carboxyl group as expressed by general formula: —$R^1$—($OR^2$)p-(O)w-$R^3$—COOH, ($R^1$ represents a straight chain or branched alkylene group having 2 to 22 carbon atoms, $R^2$ represents a straight chain or branched alkylene group having 2 to 4 carbon atoms, $R^3$ represents a bond (-) or a straight chain or branched alkylene group having 1 to 22 carbon atoms, p represents a number from 0 to 200, and w represents a number of 0 or 1),
R represents the same or a different alkyl or alkoxy group, having 1 to 22 carbon atoms, or phenyl group,
R' is Rc or R,
a and b each represent a positive number, where preferably a 2 and b 2,
a+b is a number within a range of 2 to 20, preferably 2 to 15, and more preferably 2 to 10, and
a/b is within a range of 0.3 to 3.0, preferably 0.3 to 2.5, more preferably 0.3 to 2.0, and even more preferably 0.5 to 2.0.).

In the general formula expressing the organic group containing a carboxyl group in the structural formula (1), $R^1$ is a straight chain alkylene group having 2 to 22 carbon atoms, preferably a straight chain alkylene group having 2 to 12 carbon atoms, and particularly preferably a straight chain alkylene group having 2 to 10 carbon atoms. Examples thereof include ethylene, propylene, trimethylene, butylene, pentamethylene, hexamethylene, heptamethylene, octamethylene, nonamethylene, decamethylene, undecamethylene, dodecamethylene, tridecamethylene, tetradecamethylene, pentadecamethylene, hexadecamethylene groups, and the like.

In addition, examples of the linear or branched alkylene group having 2 to 4 carbon atoms of $R^2$ include ethylene, propylene, trimethylene and butylene groups, and an ethylene group is particularly preferable.

Examples of the linear or branched alkylene group having 1 to 22 carbon atoms of $R^3$ include ethylene, ethylethylene, propylene, trimethylene, tetramethylene, pentamethylene, hexamethylene, heptamethylene, octamethylene, nonamethylene, decamethylene, undecamethylene, dodecamethylene, tridecamethylene, tetradecamethylene, pentadecamethylene, and hexadecamethylene groups. Among these, those having 1 to 12 carbon atoms, particularly those in which the sum of the carbon atoms of $R^1$ and $R^3$ is 2 to 22 are preferable.

p represents the number of 0 to 200, and the number of 0 to 20 is preferable, and the number of 0 to 10 is particularly preferable. In addition, w represents the number of 0 or 1, and is preferably 0. Note that, when p and w are both 0, the carboxyl group-containing organic group is represented by the structural formula —($C_nH_{2n}$)—COOH, and the carboxyl group-containing organic group preferably has a structure in which one carboxyl group is bonded to a silicon atom via a linear or branched alkylene group having 3 to 44 carbon atoms. In the formula, n is a number of 3 to 44, preferably a number of 3 to 20, and particularly preferably a number of 3 to 16.

The carboxylic acid modified silicone (A) as expressed by structural formula (1) is not particularly limited so long as at least one organic group containing a carboxyl group is an organosiloxane introduced in a side chain or at an end. Preferably, the carboxyl group-containing organic group is introduced into the side chain of the organosiloxane.

Therefore, examples of the (A) carboxylic acid modified silicone as expressed by the structural formula (1) include: those in which a silicone main chain is grafted with an organic group containing a carboxyl group as a side chain; those in which an organic group containing a carboxyl group as a side chain is added to one end of a silicone main chain; those in which an organic group containing a carboxyl group as a side chain is added to both ends of a silicone main chain; and those in which an organic group containing a carboxyl group as a side chain is added to both ends of a silicone main chain, and the organic group containing a carboxyl group as a side chain is further grafted as a side chain; optionally, those in which carboxylic acid modified silicone having a long-chain alkyl group having 6 or more carbon atoms; and the like. The carboxylic acid-modified silicone in which a silicone main chain is grafted with a carboxyl group-containing organic group is most suitable as a side chain. Note that, when the carboxylic acid-modified silicone has a long chain alkyl group, compounding stability with an organic oil agent such as hydrocarbon oil or an organic material for a cosmetic composition (in particular, UV absorber) may be improved.

The carboxylic acid modified silicone (A) expressed by structural formula (1) is preferably a carboxylic acid modified silicone in which R' is R and a carboxyl group-containing organic group expressed by the general formula: $—R^1—(OR^2)p-(O)w-R^3—COOH$ is grafted to the silicone side chain, more preferably in which the silicone side chain has a plurality of the carboxyl group-containing organic groups, and still more preferably in which R' is R and the silicone side chain has a plurality of the carboxyl group-containing organic groups and a/b=1.

In structural formula (1), R is preferably a methyl group, an alkoxy group, or a phenyl group, but from the viewpoint of compounding stability with an organic oil agent such as a hydrocarbon oil or an organic material for a cosmetic composition (in particular, a UV absorber), R may have a long chain alkyl group with 6 to 22 carbon atoms in a part.

In the present invention, such carboxylic acid-modified silicone can be manufactured by known methods such as a method of subjecting dimethylpolysiloxane having a Si—H group and an unsaturated carboxylic acid ester compound to addition reaction under a platinum catalyst and to saponification to form carboxylic acid; a method of subjecting dimethylpolysiloxane having a Si—H group to addition reaction of unsaturated carboxylic acid silyl ester or allyloxycarboxylic acid silyl ester under a platinum catalyst, and to obtain the desired product by hydrolysis after the reaction; and a method of obtaining carboxylic acid-modified silicone at both ends by an equilibrium reaction using bis(hydroxycarbonylethyl) tetramethyldisiloxane with cyclic siloxane and an acidic catalyst (Silicone Handbook, edited by Kunio Ito, NIKKAN KOGYO SHIMBUN, LTD. pp. 166-167). Furthermore, particularly, examples of the suitable carboxylic acid-modified silicone of the present invention include those available from the trade name ES-5800 Formulation Aid (available from Dow Toray Co., Ltd.), and the like.

In the present invention, the carboxylic acid modified silicone serving as component (A) is a component that functions as a surfactant, and at the same time, can be used in combination with the water-soluble thickening agent (B) and basic compound (C) to form an aqueous dispersion in which an inorganic ultraviolet light blocking agent containing the hydrophobic fine particulate metal oxide (D) is stably and uniformly dispersed in an aqueous phase, even in the presence of a hydrophobic fine particulate titanium oxide, hydrophobic fine particulate zinc oxide, or the like, or a water-soluble component derived therefrom and present in an aqueous phase. On the other hand, if no carboxylic acid modified silicone is used or if a carboxylic acid modified silicone other than structural formula (1) is used, it may not be possible to form a stable aqueous dispersion even if the aforementioned components (B) and (C) are used, particularly in a cosmetic composition containing hydrophobized fine particulate zinc oxide. Furthermore, if a carboxylic acid modified silicone other than structural formula (1) is used, the water resistance and sebum resistance of the obtained film (=cosmetic film) may be insufficient even if components (B) and (C) described above are used.

In the cosmetic composition, and particularly the oil-in-water cosmetic composition of the present invention, the carboxylic acid modified silicone (A) is preferably included within a range of 0.1% to 15% by mass, more preferably a range of 0.2% to 10% by mass, and even more preferably a range of 0.2% to 7.5% by mass, relative to the total mass of the cosmetic composition.

In the cosmetic composition of the present invention, when the inorganic ultraviolet light blocking agent containing the hydrophobic fine particulate metal oxide (D) is uniformly and stably dispersed in an aqueous phase, component (A) is preferably included at an amount within a range of 5 to 40 parts by mass, and particularly preferably 7.5 to 35 parts by mass relative to 100 parts by mass of component (D). When component (A), component (B) and component (C) are used together in the aforementioned range, component (D) is stably dispersed in the aqueous phase over a long period of time, providing a film (=cosmetic film) with favorable water resistance and sebum resistance in addition to favorable storage stability.

On the other hand, if the cosmetic composition of the present invention uses a small amount of a surfactant other than the carboxylic acid modified silicone (A) with a specific structure, or does not contain another surfactant, the water resistance of the cosmetic film obtained by the cosmetic composition of the present invention may be further enhanced. For example, when the content of the surfactant other than the (A) carboxylic acid-modified silicone is less than 5% by mass of the total mass of the cosmetic composition, the water resistance of the cosmetic film may be further improved due to the combination with the hydrophobic powder, which is the component (D). In particular, from the perspective of improving the water resistance of the cosmetic film, the content of the surfactant other than the (A) carboxylic acid-modified silicone is advantageously low, preferably 3% by mass or less, more preferably 2% by mass or less, and still more preferably 1% by mass or less. The cosmetic composition of the present invention is most preferably free of any surfactant other than the (A) carboxylic acid-modified silicone.

[(B) Water-Soluble Thickening Agent]

Component (B) is a water-soluble thickening agent, and is a component that suppresses an effect of a water-soluble component derived from hydrophobized fine particulate powder when used in combination with the carboxylic acid modified silicone (A) with a specific structure, can adjust the viscosity and feel during use of a formulation even when a large amount of an inorganic ultraviolet light blocking agent is blended, and can achieve a dispersion condition in a stable aqueous phase of the inorganic ultraviolet light blocking agent to further improve storage stability of a cosmetic composition.

In the present invention, particularly when the cosmetic composition contains hydrophobized fine particulate zinc oxide and contains Zn2+ in an aqueous phase, a specific combination of the carboxylic acid modified silicone (A) of a specific structure and component (B) described above is particularly preferable from the perspective of stably dispersing component (D) in an aqueous phase. Specifically, the water-soluble thickening agent (component (B)) particularly preferably contains one or more types selected from: (b1) carboxyvinyl polymers; (b2) acrylic acid copolymers or salts thereof; (b3) alkyl acrylate/methacrylate polyoxyethylene copolymers; (b4) polyacrylam ides; and (b5) water-soluble natural polysaccharide polymers. By using a water-soluble thickening agent selected from (b1) to (b5) in combination with the aforementioned component (A), component (D) can be stably and uniformly dispersed in an aqueous phase, even when the aqueous phase contains a large amount of hydrophobized fine particulate zinc oxide and a water-soluble component derived therefrom due to a portion or all of component (D) being a hydrophobized fine particulate zinc oxide and a blending amount thereof being relatively large. Moreover, the storage stability of the cosmetic composition is improved, and the water resistance and sebum resistance of an obtained cosmetic film are not impaired. Note that the technical effects may not be achieved with carboxylic acid modified silicones that do not correspond to component (A).

Of these water-soluble thickening agent serving as component (B), the acrylic acid copolymer (b2) or a salt thereof and the polyacrylamide (b4) are components that are also blended in a phase inversion type composite raw material product in addition to having a thickening effect on an aqueous phase.

The carboxyvinyl polymer (b1) is a cross-linked acrylic acid polymer (INCI name: carbomer). Specific examples of commercially available products that can be used as carboxyvinyl polymers include Carbopol 910, 934, 940, 941, 980, and 2984, ETD 2050, Ultrez 10 (the aforementioned are manufactured by Lubrizol Advanced Materials), HIVISWAKO 103, 104, and 105 (the aforementioned are manufactured by Wako Pure Chemical Industries, Ltd.), AQUPEC HV-505E and HV-805EG (manufactured by Sumitomo Seika Chemicals Co., Ltd.), and the like, and the carboxyvinyl polymer may be modified with alkyl or the like. Specific examples of modified acrylic acid/methacrylic acid styrene/alkylene copolymers include alkyl acrylate/methacrylate copolymers and styrene acrylate/methacrylate copolymers. More specifically, acrylic acid/methacrylic acid alkyl copolymers are copolymers of an acrylic acid and alkyl methacrylate having 10 to 30 carbon atoms (INCI name: (acrylate/alkyl acrylate (C10 to 30)) crosspolymers), and commercially available products that can be used include Pemulen TR-1 and TR-2, Carbopol ETD 2020 and 1382, Ultrez 20 and 21 (the aforementioned are manufactured by Lubrizol Advanced Materials), AQUPEC HV-501 ER and HV-701EDR (manufactured by Sumitomo Seika Chemicals Co., Ltd.), and the like.

Examples of the acrylic acid copolymer (b2) or a salt thereof include polyacrylic acids, Na polyacrylates, and the like. Examples of the Na polyacrylates that can be used include ACULYN™ RM2051 Thickening Agent (Na polyacrylate, dimethicone, cyclopentasiloxane, trideceth-6, PEG/PPG-18/18 dimethicone) and the like. Similarly, examples of other acrylic acid copolymers or salts thereof include (dimethyltaurin ammonium/vinylpyrrolidone acrylate) copolymers, (acryloyl dimethyltaurin ammonium/behnes-25 methacrylate) crosspolymers, (sodium acrylate/(Na acrylate/Na acryloyl dimethyl taurine) copolymers, and examples of commercially available products thereof that can be used include Aristoflex AVC (manufactured by Clariant), Aristoflex HMB (manufactured by Clariant), SEPIGEL EG (manufactured by SEPPIC), ACULYN™ Siltouch Rheology Modifier (manufactured by Dow Inc.), and the like.

(b3) The alkyl acrylate/methacrylate polyoxyethylene copolymer is a polyoxyethylene alkyl ether of a copolymer of an acrylic acid and an alkyl methacrylate having 10 to 30 carbon atoms, and an alkyl acrylate, alkyl methacrylate, polyoxyethylene (20) stearyl ether, or the like can be used. These alkyl acrylate/methacrylate polyoxyethylene copolymers can be a commercially available product such as ACULYN™ 22, 28, 33A, 38, 44, or 88, EXCEL (the aforementioned manufactured by Dow Inc.), or the like.

An example of the polyacrylamide (b4) includes a cross-linking copolymer of 2-acrylamide-2-methylpropanesulfonic acid. SEPIGEL 305 (polyacrylamide, hydrogenated polyisobutene, laureth-7, water; containing 40% by mass of polyacrylamide) and SEPIGEL 501 (polyacrylamide, polysorbate 85, mineral oil, isoparaffin; containing 20% by mass of polyacrylamide), which are composite raw materials from SEPPIC, can be used, for example.

Examples of the water-soluble natural polysaccharide polymers (b5) include carrageenan, agar, furcellan, guar gum, tamarind gum, dextrin, starch, locust bean gum, arabinogalactan, pectin, wheat protein, soy protein, chitosan, chondroitin sulfate, hyaluronic acid, sodium hyaluronate, sodium acetyl hyaluronate, hydrolyzed hyaluronic acid, albumin, gelatin, casein, soluble collagen, curdlan, xanthan gum, gellan gum, cyclodextrin, dextran, pullulan, crystalline cellulose, methyl cellulose, ethyl cellulose, carboxymethyl cellulose, hydroxymethyl cellulose, hydroxyethyl cellulose, hydroxypropyl cellulose, hydroxypropyl methyl cellulose, cationized cellulose, carboxymethyl starch, methyl starch, soluble starch, starch phosphate esters, propylene glycol alginate esters, alginates, cationized guar gum, hydroxypropylated guar gum, modified potato starch, hydroxypropyl starch phosphoric acids, and other starch modified products, and the like. Preferred examples include xanthan gum, carboxymethyl cellulose, hydroxyethyl cellulose, hydroxypropyl methyl cellulose, methyl cellulose, and the like.

Other water-soluble thickening agents that are commonly used in cosmetic compositions can be used. Specific examples include polyethylene glycol, polyoxyethylene polyoxypropylene block copolymers, polyvinyl alcohols, polyvinyl pyrrolidone, polyvinyl methyl ether, and the like.

The blending amount of the water-soluble thickening agent (B) in the cosmetic composition of the present invention is not particularly limited, but is preferably 0.01 to 5 mass %, more preferably 0.05 to 2 mass %, and even more preferably 0.1 to 2 mass %, relative to the total mass of the cosmetic composition. By selectively combining the aforementioned components (A) and (B) within the aforementioned mass range in the cosmetic composition of the present invention in the presence of component (C) described later, an influence of hydrophobic fine particulate metal oxide dispersed in an aqueous phase or water-soluble components derived therefrom can be suppressed, and a large amount of component (D) can be stably dispersed in the aqueous phase.

If the amount of component (B) used is less than the aforementioned lower limit, the dispersion stability of component (D) in an aqueous phase may be impaired.

[(C) Basic Compound]

The cosmetic composition of the present invention contains at least one basic compound (C). The component (C) is capable of anionizing the carboxylic acid modified moiety of the aforementioned (A) carboxylic acid-modified silicone, and improves the function of the (A) carboxylic acid-modified silicone as a surfactant. In particular, the oil-in-water emulsion cosmetic composition of the present invention, which contains an inorganic ultraviolet light blocking agent containing the hydrophobic fine particulate metal oxide (D), not only enables component (D) to be more favorably dispersed in an aqueous phase of the cosmetic composition of the present invention than component (A) alone, and improves the storage stability and film forming properties of the entire cosmetic composition, but also contributes to the formation of an aqueous dispersion structure in which a large amount of component (D) is stably dispersed in an aqueous phase.

The basic compound used in the present invention is not particularly limited as long as the basic compound is a compound that exhibits basicity when dissolved in water, and various types of inorganic compounds and organic compounds can be used. One or more types of basic compounds may be compounded.

Examples of the organic compound include monoethanolamine, triethanolamine, 2-amino-2-methyl-1,3-propanediol, aminomethylpropanol, arginine, and guanidine.

Examples of the inorganic compounds include sodium hydroxide, sodium carbonate, potassium hydroxide, potassium carbonate, calcium hydroxide, calcium carbonate, ammonia, and the like. Among these, potassium hydroxide can be particularly suitably used.

The blending amount of the basic compound in the cosmetic composition of the present invention is not particularly limited, but in the case of a monovalent base per 1 mol of the carboxylic acid group contained in the blended carboxylic acid modified silicone, the carboxylic acid group/monovalent base (molar ratio) is preferably 1/0.5 to 1/1.5.

The pH of the cosmetic composition of the present invention may be acidic or alkaline, but the carboxylic acid modified moiety of the aforementioned carboxylic acid modified silicone (A) is anionized, and is preferably weakly alkaline from the perspective of improving dispersibility with regard to the hydrophobic powder containing component (D). Specifically, the pH is preferably within a range of 7.1 to 9.5, and more preferably within a range of 7.2 to 8.5.

[(D) Inorganic UV Protecting Agent Consisting of Hydrophobic Fine Particulate Metal Oxide]

The cosmetic composition of the present invention contains an inorganic ultraviolet light blocking agent containing a hydrophobic fine particulate metal oxide, and even if the hydrophobic fine particulate metal oxide and a water-soluble component derived from the metal oxide are present in the aqueous phase, a thickening effect based on component (B) is not impaired. Therefore, a large amount of the inorganic ultraviolet light blocking agent can be stably dispersed in an aqueous phase. Normally, when the hydrophobic fine particulate metal oxide (component (D)) or a water-soluble component derived therefrom is present in an aqueous phase, the overall viscosity of a formulation is reduced even when component (B) is used, and thus uniform dispersion of these inorganic ultraviolet light blocking agent is difficult to perform. However, by combining the aforementioned components (A) and (C), a large amount of the inorganic ultraviolet light blocking agent can be stably dispersed in the aqueous phase, the ultraviolet light blocking performance of the cosmetic composition is increased, the texture of the cosmetic composition and feel during use is not impaired as much as possible, and a cosmetic composition with excellent water resistance and the like of a film (cosmetic film) can be provided.

In particular, it has been common knowledge for a person of ordinary skill in the art that the overall viscosity of a formulation is reduced and the degree of freedom in formulation is greatly impaired in a cosmetic composition containing hydrophobized fine particulate zinc oxide as component (D), even if component (B) is used. Surprisingly, however, when component (A) of the present invention is used, the hydrophobized fine particulate zinc oxide is stably dispersed in an aqueous phase, and thus a cosmetic composition with excellent ultraviolet light blocking performance, texture and feel during use.

In other words, the present invention has an advantage where the aforementioned component (A) is selectively used together with component (B) to form an aqueous dispersion in which component (D), such as the hydrophobized fine particulate zinc oxide or the like, is stably dispersed in a large amount in an aqueous phase, and therefore, a high SPF value for the cosmetic composition as a whole can be achieved with an excellent effecting shielding UV-B waves (wavelength: 280 to 315 nm) derived from the component, without impairing the appearance, feel during use, storage stability, and the like of the cosmetic composition. Furthermore, the component (D) of the present invention can be dispersed in the aqueous phase and the oil phase; however, by using the aforementioned basic compound (C), the oil-in-water emulsion cosmetic composition is well dispersed in the aqueous phase, and the feeling of use as a cosmetic composition, the UV protection effect, and the detergency with soap or the like are further improved.

The component (D) of the present invention is a hydrophobized metal oxide, which is an inorganic UV protecting agent having an ultraviolet light shielding effect. Examples of such component (D) include one or more types of inorganic ultraviolet light blocking agents selected from hydrophobized fine particulate titanium oxides and hydrophobized fine particulate zinc oxides, but from the perspective of achieving a specific effect of the present invention, at least a portion of component (D) is preferably a hydrophobized fine particulate zinc oxide. Here, the particle size of the hydrophobic fine particulate titanium oxide and hydrophobic fine particulate zinc oxide is preferably 1 to 200 nm in terms of ultraviolet protection effect and dispersibility, and more preferably 10 to 80 nm. Preferably, component (D) contains at least hydrophobized fine particulate zinc oxide (D1-1) having an average particle diameter within a range of 1 to 200 nm.

The hydrophobizing treatment in the component (D) is not particularly limited, and means that the powder is treated with various hydrophobized surface treatment agents. Examples of the hydrophobizing treatment include a methyl hydrogen polysiloxane (methylcon in Japanese cosmetics label name) treatment, a (dimethicone/methicone) copolymer (hydrogen dimethicone in Japanese cosmetics label) treatment, a dimethylpolysiloxane (dimethicone in Japanese cosmetics label) treatment, a silicone resin treatment, a silicone gum treatment, an acrylic silicone treatment, an organosiloxane treatment such as a fluorinated silicone treatment; a metal soap treatment such as a zinc stearate treatment, a silane coupling agent treatment; a silane treatment such as an alkylsilane treatment, a fluorine compound treatment such as a perfluoroalkyl phosphate ester salt; a perfluoro-ether treatment; an amino acid treatment such as an N-lauroyl-L-lysine treatment; an oil agent treatment such as a squalane treatment; and an acrylic acid treatment such as an alkyl acrylate treatment, and the like, and two or more of these treatments can be also used in combination.

Among these treatments, the treatment with the silicone compound is preferable from the perspective of the water resistance and ease of dispersion by the carboxylic acid-modified silicone. Among them, it is particularly preferable that the treatment is performed with methylhydrogenpolysiloxane, (dimethicone/methicone) copolymer, dimethylpolysiloxane, or alkylsilane.

Herein, the carboxylic acid-modified silicone with a specific structure (component (A) has a function as a surfactant, and therefore can also be used as a powder dispersing agent for component (D) or the like, and can further improve the dispersion condition of component (D) in a final cosmetic composition formulation. Specifically, when manufacturing the cosmetic composition, the inorganic ultraviolet light blocking agent (component (D)) is particularly preferably blended into the cosmetic composition in a form of a powder dispersion (slurry) that has been mixed in advance with all or a portion of component (A). Furthermore, in this case, the use of component (A) has an aspect as a surface treatment agent for component (D), which further improves the dispersion condition of component (D) in an aqueous phase.

The blending amount of component (D) in the cosmetic composition of the present invention is not particularly limited, but is preferably 1 to 40% by mass, more preferably from 2 to 35% by mass, and even more preferably 5 to 20% by mass, relative to the total mass of the cosmetic composition. As described above, while the SPF value of a cosmetic generally increases as the amount of component (D) increases, even if component (B) is used, the viscosity of the entire formulation decreases due to an influence of component (D) hydrophobic fine particulate metal oxide or water-soluble component derived therefrom, and the feel during use unique to cosmetic compositions tends to be impaired in addition to the deterioration of appearance due to the separation of the cosmetic composition and reduction of storage stability. However, selectively using components (A) and (B) together in the cosmetic composition of the present invention suppresses reductions in viscosity of the entire cosmetic composition formulation. Thus a cosmetic composition can be designed with excellent ultraviolet light blocking performance (high SPF value), excellent sebum and water resistance of a cosmetic film, and a high degree of freedom in formulation design, without impairing the feel during use and storage stability of the cosmetic composition. Note that a suitable compounding amount of the component (A) and the component (B) is as described above based on 100 parts by mass of the component (D).

[Other Hydrophobic Powders]

The cosmetic composition of the present invention may optionally contain a hydrophobic powder other than component (D). These powders include white and colored pigments, body pigments. The white and colored pigments are used for coloring cosmetic compositions and the like, while extender pigments are used for improving the tactile sensation of the cosmetic compositions. In addition, when the surface of these powders itself is not hydrophobic, the surface thereof is subjected to a hydrophobization treatment in the same manner as the component (D) described above. Note that these hydrophobic powders may be complexed together. As described above, in the present invention, an effect of hydrophobic fine particulate metal oxide or a water-soluble component derived therefrom present in an aqueous phase on the viscosity of the formulation is suppressed. Therefore, the effect on the formulation of metal oxide fine particles, which are powders other than component (D), or the same or similar water-soluble components derived therefrom is suppressed. Thus, it is possible to provide a cosmetic composition having favorable appearance, storage stability and cosmetic film performance.

The shape of the powder (spherical shape, rod shape, needle shape, plate shape, irregular shape, spindle shape, and the like), particle size (aerosol, fine particles, pigment grade, and the like), and particle structure (porous, non-porous, and the like) are not limited, and the average primary particle size is preferably in the range of 1 nm to 100 μm.

Examples of the hydrophobic powder other than the component (D) include inorganic powders, organic powders, surfactant metal salt powders (metal soaps), colored pigments, pearl pigments, metal powder pigments, and composites of these can also be used. Specifically, inorganic powders include zirconium oxide, cerium oxide, magnesium oxide, barium sulfate, calcium sulfate, magnesium sulfate, calcium sulfate, magnesium carbonate, talc, mica, kaolin, sericite, muscovite, synthetic mica, phlogopite, lepidolite, biotite, lithia mica, silicic acid, silicic anhydride, aluminum silicate, sodium silicate, sodium magnesium silicate, magnesium silicate, magnesium aluminum silicate, calcium silicate, barium silicate, strontium silicate, metal tungstate, hydroxyapatite, vermiculite, hydrargilite, bentonite, montmorillonite, hectorite, zeolite, ceramic powder, dicalcium phosphate, alumina, aluminum hydroxide, boron nitride, boron nitride, and the like; organic powders include polyamide powder, polyester powder, polyethylene powder, and polypropylene powder, polystyrene powder, polyurethane powder, polystyrene powder, benzoganamine powder, polymethylbenzoganamine powder, polytetrafluoroethylene powder, polymethyl methacrylate powder, cellulose, silk powder, nylon powder, 12-nylon, 6-nylon, silicone powder, polymethylsilsesquioxane spherical powder, a styrene/acrylic acid copolymer, a divinylbenzene/styrene copolymer, a vinyl resin, a urea resins, a phenol resin, a fluororesin, a silicon resin, an acrylic resin, a melamine resin, an epoxy resin, a polycarbonate resin, microcrystalline fiber powder, starch powder, lauroyl lysine, and the like; surfactant metal salt powders include zinc stearate, aluminum stearate, calcium stearate, magnesium stearate, zinc myristate, magnesium myristate, zinc palmitate, zinc laurate, zinc cetyl phosphate, calcium cetyl phosphate, sodium zinc cetyl phosphate, and the like; colored pigments include inorganic red pigments such as red oxide, iron oxide, iron hydroxide, iron titanate, inorganic brown pigments such as γ-iron oxide, inorganic yellow pigments such as yellow iron oxide, black iron oxide, inorganic black pigments such as carbon black, inorganic purple pigments such as manganese violet, cobalt violet, and the like, inorganic green pigments such as chromium hydroxide, chromium oxide, cobalt oxide, cobalt titanate, and the like, inorganic blue pigments such as prussian blue, ultramarine blue, and the like; those obtained by laking tar dyes such as Red No. 3, Red No. 104, Red No. 106, Red No. 201, Red No. 202, Red No. 204, Red No. 205, Red No. 220, Red No. 226, Red No. 227, Red No. 228, Red No. 230, Red No. 401, Red No. 505, Yellow No. 4, Yellow No. 5, Yellow No. 202, Yellow No. 203, Yellow No. 204, Yellow No. 401, Blue No. 1, Blue No. 2, Blue No. 201, Blue No. 404, Green No. 3, Green No. 201, Green No. 204, Green No. 205, Orange No. 201, Orange No. 203, Orange No. 204, Orange No. 206, Orange No. 207, and the like, or those obtained by laking natural dyes such as carmine acid, lacquemic acid, carthamine, braziline, chrosine and the like; pearl pigments such as titanium oxide-coated mica, titanated mica, iron oxide-treated titanated mica, titanium oxide-coated mica, bismuth oxychloride, titanium oxide-coated bismuth oxychloride, titanium oxide-coated talc, fish scale foil, titanium oxide-coated colored mica and the like; oxidized titanium oxide coated mica, oxychlorinated bismuth, titanium oxide coated bismuth oxychloride, titanium oxide coated tantalum foil, fish scaly foil, titanium oxide coated colored mica, and the like; metal powder pigments such as aluminum, gold, silver, copper, platinum, stainless steel, and the like.

A silicone elastomer powder may also be used as the hydrophobic powder. The silicone elastomer powder is a crosslinked product of a liner diorganopolysiloxane mainly composed of a diorganosiloxy unit (D unit), and can be suitably obtained by crosslinking an organohydrogenpolysiloxane having a silicon-bonded hydrogen atom at the side chain or end and a diorganopolysiloxane having an unsaturated hydrocarbon group such as an alkenyl group at the side chain or end under a hydrosilylation reaction catalyst. Since the silicone elastomer powder is soft, elastic, and excellent in oil absorption compared to the silicone resin powder composed of a T unit and a Q unit, the silicone elastomer powder can absorb oil and fat on the skin and prevent cosmetic collapse.

The silicone elastomer powder may have various shapes, such as spherical, flat, or indefinite. The silicone elastomer powder may be in the form of an oil dispersion. The cosmetic composition of the present invention is a silicone elastomer powder having a particle shape, a primary particle diameter thereof determined by observation using an electron microscope and/or an average primary particle diameter measured by laser diffraction/scattering method falls within a range of 0.1 to 50 µm, and a silicone elastomer powder having a spherical primary particle shape can be suitably compounded. The silicone elastomer constituting the silicone elastomer powder is preferably a silicone elastomer having a hardness of 80 or less, more preferably 65 or less according to JIS K 6253 "Hardness testing method for rubber, vulcanized or thermoplastic" as measured by type-A durometer. In addition, these silicone elastomer powders may optionally be subjected to a surface treatment with a silicone resin, silica, or the like.

The blending amount of the hydrophobic powder other than component (D) is not particularly limited, but the total blending amount of component (D) and the hydrophobic powder is preferably 0.1% to 40% by mass, more preferably 0.1% to 35% by mass, and even more preferably 1% to 20% by mass, based on the total mass of the cosmetic composition.

The component (D) and the hydrophobic powder other than the component (D) are dispersible in the oil phase and/or in the aqueous phase, but in the present invention, the basic compound (C) is used, and these hydrophobic powder components are well dispersed in the aqueous phase. Furthermore, when the (G) polyhydric alcohol described below is used, these hydrophobic powders can be uniformly dispersed in the aqueous phase. Furthermore, as described above, component (A) functions as a powder dispersing agent. Therefore, component (D) and a hydrophobic powder other than component (D) may be blended into the cosmetic composition in the form of a powder dispersion with a portion or all of component (A).

[(E) Oil Agent]

The cosmetic composition of the present invention may contain at least one type of oil agent (E). The oil agent forms an oil phase in the cosmetic composition of the present invention. In this case, the cosmetic composition of the present invention may be and is preferably in the form of an oil-in-water emulsion cosmetic composition.

The "oil agent" in the present invention is generally used as a component of a cosmetic composition, and is not particularly limited. The oil agent is usually liquid at room temperature, but may be a solid such as wax, or may be in the form of a highly viscous and viscous gum or paste, which will be described later.

The oil agent is preferably at least one type of liquid at 5° C. to 100° C. selected from the group consisting of silicone oil, a nonpolar organic compound, and a low polarity organic compound.

Silicone oils are hydrophobic, and their molecular structure may be cyclic, linear, or branched. The viscosities of silicone oils at 25° C. are usually in the range of 0.65 to 100,000 mm$^2$/s, preferably in the range of 0.65 to 10,000 mm$^2$/s.

Silicone oils include, for example, linear organopolysiloxanes, cyclic organopolysiloxanes, and branched organopolysiloxanes. Among these, linear organopolysiloxanes, cyclic organopolysiloxanes, and branched organopolysiloxanes that are volatile are preferable.

More specifically, examples of linear organopolysiloxanes include dimethylpolysiloxane capped at both molecular chain ends with trimethylsiloxy groups (dimethylsilicone having low viscosity such as 2 mPa·s or 6 mPa·s to high viscosity of 1,000,000 mPa·s), organohydrogenpolysiloxane, methylphenylpolysiloxane capped at both molecular chain ends with trimethylsiloxy groups, dimethylsiloxane/methylphenylsiloxane copolymer capped at both molecular chain ends with trimethylsiloxy groups, diphenylpolysiloxane capped at both molecular chain ends with trimethylsiloxy groups, dimethylsiloxane/diphenylsiloxane copolymer capped at both molecular chain ends with trimethylsiloxy groups, trimethylpentaphenyl trisiloxane, phenyl (trimethylsiloxy) siloxane, methyl alkyl polysiloxane capped at both molecular chain ends with trimethylsiloxy groups, dimethylpolysiloxane/methylalkylsiloxane copolymer capped at both molecular chain ends with trimethylsiloxy groups, dimethylsiloxane/methyl (3,3,3-trifluoropropyl) siloxane capped at both molecular chain ends with trimethylsiloxy groups, α,ω-dihydroxypolydimethylsiloxane, α,Ω-diethoxypolymethylsiloxane, 1,1,1,3,5,5,5-heptamethyl-3-octyltrisiloxane, 1,1,1,3,5,5,5-heptamethyl-3-dodecyltrisiloxane, 1,1,1,3,5,5,5-heptamethyl-3-hexadecyltrisiloxane, tristrimethylsiloxymethylsilane, tristrimethylsiloxyalkylsilane, tetrakistrimethylsiloxysilane, tetramethyl-1,3-dihydroxydisiloxane, octamethyl-1,7-dihydroxytetrasiloxane, hexamethyl-1,5-diethoxytrisiloxane, hexamethyldisiloxane, octamethyltrisiloxane, higher alkoxy modified silicones, higher fatty acid modified silicones, dimethiconol and the like.

Examples of cyclic organopolysiloxanes include hexamethylcyclotrisiloxane (D3), octamethylcyclotetrasiloxane (D4), decamethylcyclopentasiloxane (D5), dodecamethylcyclotetrasiloxane (D6), 1,1-diethylhexamethylcyclotetrasiloxane, phenylheptamethylcyclotetrasiloxane, 1,1-diphenylhexamethylcyclotetrasiloxane, 1,3,5,7-tetravinyltetramethylcyclotetrasiloxane, 1,3,5,7-tetramethylcyclotetrasiloxane, 1,3,5,7-tetracyclohexyltetramethylcyclotetrasiloxane, tris(3,3,3-trifluoropropyl) trimethylcyclotrisiloxane, 1,3,5,7-tetra(3-methacryloxypropyl)tetramethylcyclotetrasiloxane, 1,3,5,7-tetra(3-acryloxypropyl)tetramethylcyclotetrasiloxane, 1,3,5,7-tetra(3-carboxypropyl)tetramethylcyclotetrasiloxane, 1,3,5,7-tetra(3-vinyloxypropyl)tetramethylcyclotetrasiloxane, 1,3,5,7-tetra(p-vinylphenyl)tetramethylcyclotetrasiloxane, 1,3,5,7-tetra[3-(p-vinylphenyl)propyl]tetramethylcyclotetrasiloxane, 1,3,5,7-tetra(N-acryloyl-N-methyl-3-aminopropyl)tetramethylcyclotetrasiloxane, 1,3,5,7-tetra(N,N-bis(lauroyl)-3-aminopropyl) tetramethylcyclotetrasiloxane, and the like.

Examples of the branched organopolysiloxane include methyltristrimethylsiloxysilane, ethyltristrimethylsiloxysilane, propyltristrimethylsiloxysilane, tetrakistrimethylsiloxysilane, and phenyltristrimethylsiloxysilane.

As the nonpolar organic compound and the low polarity organic compound, a hydrocarbon oil and a fatty acid ester oil are preferable. These are components which are widely used, in particular, as substrates for make-up cosmetics.

Examples of the hydrocarbon oil include liquid paraffin, light liquid isoparaffin, heavy liquid isoparaffin, petrolatum, n-paraffin, isoparaffin, isododecane, isohexadecane, polyisobutylene, hydrogenated polyisobutylene, polybutene, ozokerite, ceresin, microcrystalline wax, paraffin wax, polyethylene wax, polyethylene polypropylene wax, scralan, squalene, pristane, polyisoprene, and the like.

Examples of fatty acid ester oils include hexyldecyl octanoate, cetyl octanoate, isopropyl myristate, isopropyl palmitate, butyl stearate, hexyl laurate, myristyl myristate, oleyl oleate, decyl oleate, octyldodecyl myristate, hexyldecyl dimethyl octanoate, cetyl lactate, myristyl lactate, diethyl phthalate, dibutyl phthalate, lanolin acetate, propylene glycol dioleate, glyceryl tri-2-ethylhexanoate, trimethylolpropane tri-2-ethylhexanoate, ditrimethylolpropane triethylhexanoate, ditrimethylolpropane (isostearate/sebacate), trimethylolpropane trioctanoate, trimethylolpropane triisostearate, diisopropyl adipate, diisobutyl adipate, 2-hexyldecyl adipate, di-2-heptyl undecyl adipate, diisostearyl malate, hydrogenated castor oil monoisostearate, octyldodecyl isostearate, isopropyl isostearate, isocetyl isostearate, ethylene glycol di-2-ethylhexanoate, cetyl 2-ethylhexanoate, pentaerythritol tetra-2-ethylhexanoate, octyldodecyl gum esters, ethyl oleate, octyldodecyl oleate, neopentyl glycol dicaprate, triethyl citrate, 2-ethylhexyl succinate, dioctyl succinate, isocetyl stearate, diisopropyl sebacate, di-2-ethylhexyl sebacate, diethyl sebacate, dioctyl sebacate, dibutyl octyl sebacate, cetyl palmitate, octyldodecyl palmitate, octyl palmitate, 2-ethylhexyl palmitate, 2-hexyldecyl palmitate, 2-heptyl undecyl palmitate, cholesteryl 12-hydroxystearylate, dipentaerythritol fatty acid esters, 2-hexyldecyl myristate, ethyl laurate, 2-octyldodecyl N-lauroyl-L-glutamate, di-(cholesteryl/behenyl/octyldodecyl) N-lauroyl-L-glutamate, di-(cholesteryl/octyldodecyl) N-lauroyl-L-glutamate, di-(phytosteryl/behenyl/octyldodecyl) N-lauroyl-L-glutamate, di-(phytosteryl/octyldodecyl) N-lauroyl-L-glutamate, N-lauroyl sarcosine isopropyl, diisostearyl malate, neopentyl glycol dioctanoate, isodecyl neopentanoate, isotridecyl neopentanoate, isostearyl neopentanoate, isononyl isononanoate, isotridecyl isononanoate, octyl isononanoate, isotridecyl isononanoate, diethyl pentanediol dineopentanoate, methyl pentanediol dineopentanoate, octyldodecyl neodecanoate, 2-butyl-2-ethyl-1,3-propanediol dioctanoate, pentaerythrityl tetraoctanoate, hydrogenated rosin pentaerythrityl, pentaerythrityl triethylhexanoate, dipentaerythrityl (hydroxystearate/stearate/rosinate), polyglyceryl tetraisostearate, polyglyceryl nonaisostearate-10, polyglyceryl deca(erucate/isostearate/lysinoleate)-8, diglyceryl oligoester (hexyl decanoate/sebacate), glycol distearate (ethylene glycol distearate), diisopropyl dimer linoleate, diisostearyl dimer linoleate, di-(isostearyl/phytostearyl) dimer dilinoleate, (phytostearyl/behenyl) dimer dilinoleate, (phytostearyl/isostearyl/cetyl/stearyl/behenyl) dimer dilinoleate, dimer dilinoleyl dimer dilinoleate, dimer dilinoleyl diisostearate, dimer dilinoleyl hydrogenated rosin condensate, hardened castor oil dimer dilinoleate, hydoxyalkyl dimer dilinoleyl ethers, glyceryl triisostearate, glyceryl trimyristate, glyceryl triisopalmitate, glyceryl trioctanoate, glyceryl trioleate, glyceryl diisostearate, glyceryl tri-(caprylate/caprate), glyceryl tri-(caprylate/caprate/myristate/stearate), glyceryl hydrogenated rosin glyceryl, hydrogenated rosin triglyceride (hydrogenated ester gum), rosin triglyceride (ester gum), glyceryl eicosanedioate behenate, glyceryl di-2-heptyl undecanoate, diglyceryl isostearate myristate, cholesteryl acetate, cholesteryl nonanoate, cholesteryl stearate, cholesteryl isostearate, cholesteryl oleate, cholesteryl 12-hydroxystearate, macadamia nut oil fatty acid cholesteryl, macadamia nut oil fatty acid phytosteryl, phytosteryl isostearate, soft lanolin fatty acid cholesteryl, hard lanolin fatty acid cholesteryl, long-chain branched fatty acid cholesteryl, long-chain α-hydroxy fatty acid cholesteryl, octyldodecyl ricinoleate, lanolin fatty acid octyldodecyl, octyldodecyl erucate, hardened castor oil isostearate, avocado oil fatty acid ethyl, lanolin fatty acid isopropyl, and the like.

For example, higher alcohols having 10 to 30 carbon atoms can be used as the low polarity organic compound. When a higher alcohol is used as the emulsion stabilizing component, the amount of hydrophilic surfactant can be reduced, and the water resistance can be further improved. The higher alcohol is a saturated or unsaturated monohydric aliphatic alcohol, and the hydrocarbon group portion may be either linear or branched, but is more preferably linear. Examples of higher alcohols having 10 to 30 carbon atoms include lauryl alcohol, myristyl alcohol, palmityl alcohol, stearyl alcohol, behenyl alcohol, hexadecyl alcohol, oleyl alcohol, isostearyl alcohol, hexyldodecanol, octyldodecanol, cetostearyl alcohol, 2-decyltetradecinol, cholesterol, sitosterol, phytosterol, lanosterol, lanolin alcohol, hydrogenated lanolin alcohol, and the like. In the present invention, it is preferable to use a higher alcohol having a melting point of from 40 to 80° C. alone, or to combine a plurality of higher alcohols so that the melting point is from 40 to 70° C.

The compounding amount of the oil agent in the cosmetic composition of the present invention is not particularly limited, and preferably from 3% to 60% by mass, more preferably from 4% to 50% by mass, still more preferably from 5% to 40% by mass, even more preferably 6% to 30% by mass, and even still more preferably 7% to 20% by mass, based on the total mass of the cosmetic composition.

(UV Absorber)

The (E) oil agent can include at least one type of UV absorber. That is, the oil phase of the cosmetic composition of the present invention can include a UV absorber. The UV absorber is preferably organic, more preferably lipophilic, and even more preferably oil soluble. In addition to the inorganic UV protecting component that is the component (D) described above, by including an organic UV absorber that is an (E) oil agent, a higher SPF value can be achieved as the whole cosmetic composition, and the ultraviolet light blocking/shielding effect can be further improved with respect to UV-A waves (wavelength: 315 to 380 nm) other than UV-B waves (wavelength 280 to 315 nm). Note that the cosmetic composition according to the present invention can and preferably contains a water-soluble ultraviolet light absorber (H) described later, in addition to the ultraviolet light absorber serving as oil agent (E).

The oil-soluble UV absorber is not particularly limited as long as it is used in cosmetic compositions or skin external use preparations, and examples thereof include those described below. The oil-soluble UV absorber can be used alone or as a mixture of two or more types.

Cinnamic acid-based UV absorbers such as benzyl paramethoxycinnamate, 2-ethylhexyl paramethoxycinnamate, and mono-2-ethylhexanoate glyceryl diparamethoxycinnamate; benzophenone-based UV absorbers such as hydroxymethoxybenzophenone, dihydroxymethoxybenzophenone, dihydroxybenzophenone, and tetrahydroxybenzophenone; benzoic acid ester-based UV absorbers such as para-aminobenzoic acid, ethyl para-aminobenzoate, glyceryl para-aminobenzoate, amyl para-dimethylaminobenzoate, octyl para-dimethylaminobenzoate, 4-[N,N-di(2-hydroxypropyl) amino] ethyl benzoate, and diethylaminohydroxybenzoyl hexyl benzoate; salicylic acid-based UV absorbers such as ethylene glycol salicylate, phenyl salicylate, octyl salicylate, benzyl salicylate, para-salicylate, and homomenthyl salicylate; triazine-based UV absorbers such as ethylhexyltriazone (2,4,6-tris[4-(2-ethylhexyloxycarbonyl) anilino] 1,3,5-triazine), and bisethylhexyloxyphenol methoxyphenyl triazine; and other UV absorbers such as 4-tert-butyl-4'-methoxydibenzoylmethane, menthyl anthranilate, 2-(2-hydroxy-5-methylphenyl) benzotriazole, 2-ethylhexyl dimethoxybenzidene dioxoimidazolidine propionate, octocrylene, and dimethicodiethyl benzalmalonate.

Among these, when selecting the UV absorbers such as 2-ethylhexyl paramethoxycinnamate, and mono-2-ethylhexanoate glyceryl diparamethoxycinnamate, octyl salicylate, homomenthyl salicylate, bisethylhexyloxyphenol methoxyphenyl triazine, dihydroxybenzophenone, octocrylene, 4-tert-butyl-4'-methoxydibenzoylmethane, diethylaminohydroxybenzoyl hexyl benzoate, and the like, a particularly high UV protection effect can be obtained.

The compounding amount of the UV absorber in the cosmetic composition of the present invention is not particularly limited, but is preferably from 3% to 30% by mass, more preferably from 5% to 25% by mass, and still more preferably from 7% to 20% by mass, based on the total mass of the cosmetic composition.

[Water]

The cosmetic composition of the present invention contains water. Water is a component that forms an aqueous phase in the cosmetic composition of the present invention, is thickened by including component (B), and has a structure in which component (D) and other hydrophobic powders are stably dispersed in the aqueous phase in the presence of component (A) and component (C). Furthermore, in addition to the emulsified particles of the aforementioned oil agent (E), the structure may be a uniform dispersion or mixture of an alcohol (G), water-soluble ultraviolet light absorber (H) and vinyl-based copolymer emulsion (I) described later.

The compounding amount of the water in the cosmetic composition of the present invention is not particularly limited, but is preferably from 20% to 95% by mass, more preferably from 40% to 80% by mass, still more preferably from 45% to 70% by mass, even more preferably 47% to 65% by mass, and even still more preferably 50% to 60% by mass, based on the total mass of the cosmetic composition.

[(F) Oil-Soluble Film Forming Agent]

The cosmetic composition of the present invention may contain at least one oil-soluble film forming agent (F). By using component (A) to component (D) described above, particularly the carboxylic acid-modified silicone serving as component (A), and the oil-soluble film forming agent (F), the entire cosmetic composition can have a high stability, and a cosmetic composition, and preferably an oil-in-water emulsion cosmetic composition that provides a cosmetic film with excellent water resistance can be provided.

The type of the oil-soluble film forming agent (F) is not particularly limited, and is preferably a silicone-based film-forming agent, and even more preferably at least one type selected from a group consisting of:

(F1) a silicone resin containing an M unit and a Q unit;
(F2) silicone acrylate;
(F3) a silicone resin containing a T unit; and
(F4) a silicone resin gum.

A silicone resin containing (F1) silicone resin containing an M unit and a Q unit may be any silicone resin normally used in the cosmetic composition. As the silicone resin containing an M unit and a Q unit, an arbitrary silicone resin can be used so long as a triorganosiloxy unit (M unit) (for example, an organo group is only an methyl group or other alkyl group, or a methyl group or other alkyl group and a vinyl group or other allyl group or a phenyl group or other aryl group) and a silicon unit (Q unit) are provided, and examples thereof include MQ resins, MDQ resins, MDTQ resins (D represents a diorganosiloxy unit. For example, an organo group is only an methyl group or other alkyl group, or a methyl group or other alkyl group and a vinyl group or other allyl group or a phenyl group or other aryl group), and the like. More specifically, trimethyl siloxysilicate, polyalkyl siloxysilicate, trimethyl siloxysilicate containing dimethylsiloxy units, and alkyl (perfluoroalkyl) siloxysilicate are exemplified. It is particularly preferable that these silicone resins are oil-soluble and can be dissolved in tetracyclosiloxane (D4) and pentacyclosiloxane (D5).

Among these, trimethyl siloxysilicate is preferable. Examples of commercially available products include MQ-1600 Resin (manufactured by Dow Toray Co., Ltd.), 749 Fluid (manufactured by Dow Toray Co., Ltd.) in which trimethyl siloxysilicate is previously dissolved in a solvent, 593 Fluid (manufactured by Dow Toray Co., Ltd.), X-21-5595, KF-7312J, and KF-7312F (all manufactured by Shin-Etsu Chemical Co., Ltd.), and the like. These may be used alone, or may be used in combination as appropriate.

Examples of the silicone acrylate (F2) include copolymers having a polyalkyl acrylate skeleton and a dimethicone polymer grafted onto the alkyl ester side chain, such as a copolymer of cyclopentasiloxane (and) acrylate/dimethicone (KP-545, manufactured by Shin-Etsu Chemical Co., Ltd.), a copolymer of methyl trimethicone (and) acrylate/dimethicone (KP-549, manufactured by Shin-Etsu Chemical Co., Ltd.), and the like. Commercially available products thereof include KP-543, 550, 545L, and the like manufactured by Shin-Etsu Chemical Co., Ltd. Furthermore, examples can also include copolymers having a polyalkyl acrylate skeleton and a siloxane dendron structure grafted to an alkyl ester side chain, such as FA4001CM, FA4002ID, FA4003DM, FA4004ID, FA PEPS (manufactured by Dow Toray Co., Ltd.) and the like, where a (acrylates/polytrimethylsiloxy methacrylate) copolymer is diluted in a solvent in advance. These may be used alone, or may be used in combination as appropriate.

The (F3) silicone resin containing a T unit may be any silicone resin normally used in the cosmetic composition. As the (F3) silicone resin containing a T unit, any silicone resin can be used as long as it has a monoorganosiloxy unit (T unit) (for example, the organo group is an alkyl group such as a methyl group, or an allyl group such as a vinyl group or an aryl group such as a phenyl group), and examples thereof include a MTQ resin, a MDTQ resin, a TD resin, a TQ resin, a TDQ resin, and the like. It is particularly preferable that these silicone resins are oil-soluble and can be dissolved in D4 and D5.

Specific examples of the silicone resin (F3) containing a T unit include 670 Fluid and 680 fluid, where a polypropylsilsesquioxane is dissolved in a solvent in advance, MQ-1640 Flake Resin, which is a mixture with a trimethylsiloxysilicic acid, SW-8005 C30 resin wax, which is an alkyl (C30 to 45) dimethylsilylpolypropylsilsesquioxane (manufactured by Dow Toray Co., Ltd.), and the like. These may be used alone, or may be used in combination as appropriate.

Examples of the silicone resin gum (F4) include FC-5002IDD (manufactured by Dow Toray Co., Ltd.), which is a (trimethylsiloxysilicate/dimethiconol) crosspolymer, and the like.

The compounding amount of the oil-soluble film forming agent in the cosmetic composition of the present invention is from 0.01% to 5% by mass, preferably from 0.05% to 3% by mass, and more preferably from 0.10% to 2% by mass, based on the total mass of the cosmetic composition.

[(G) Alcohols]

The cosmetic composition of the present invention can contain at least one alcohol (G). Alcohols include one or more types selected from ethanol and other mono alcohols and polyhydric alcohols.

By including alcohols, a fresh feel, moisturizing feel and the feel of use of the cosmetic composition of the present invention can be adjusted, and when the cosmetic composition of the present invention contains hydrophobic powder such as component (D) or the like, component (A) and hydrophobic powder are premixed with a polyhydric alcohol and then mixed with another component to prepare the cosmetic composition, and thereby the hydrophobic powder can be favorably dispersed in an aqueous phase.

Examples of mono alcohols include ethanol, isopropanol and other lower alcohols. In particular, ethanol is a general-purpose dispersing solvent and is used in many cosmetic compositions.

Examples of the polyhydric alcohols include sorbitol, xylitol, propylene glycol, dipropylene glycol, 1,3-butanediol, glycerin, diglycerin, polyethylene glycol, and the like, and these polyhydric alcohols can be used alone or in combination of two or more types.

When the component (A) and the hydrophobic powder are pre-mixed together with the alcohols, liquid alcohols can be uniformly dispersed in an aqueous phase. Of these, ethanol, propylene glycol, dipropylene glycol, 1,3-butanediol, glycerin, diglycerin, and combinations thereof are preferable.

The blending amount of the alcohols in the cosmetic composition of the present invention is not particularly limited, and is preferably 0.3% to 30% by mass, more preferably 0.5% to 25% by mass, even more preferably 1% to 20% by mass, even yet more preferably 2% to 20% by mass, and even still more preferably 3% to 15% by mass, based on the total mass of the cosmetic composition.

[(H) Water-Soluble UV Absorber]

In addition to the oil phase, the cosmetic composition of the present invention may also contain an ultraviolet light absorber for an aqueous phase, and may further improve the SPF value and a PA index value of the overall amount of a cosmetic. Specifically, it may contain at least one (H) water-soluble UV absorber soluble in the aqueous phase.

The type and amount of such water-soluble UV absorber is not particularly limited as long as it is used in a cosmetic composition or a skin external use preparation, and examples thereof include phenyl benzimidazole sulfonic acid (PBSA), 2-hydroxy-4-methoxybenzophenone, telephthalilidene dicamphor sulfonic acid (Mexoryl(trademark) SX), oxybenzone-4, benzophenone-4, benzophenone-5, benzylidene camphorsulfonic acid, cinnamaldehyde-trimonium chloride, methoxycinnamide-propylethyldimonium chloride ether, disodium bisethylphenyl triaminotriazine stilbene disulfonate, disodium distyrylbiphenyl disulfonate, phenyldivene imidazole disodium tetrasulfonate, methoxycinnamide-propylhydroxysultaine, methoxycinnamide-propylrauldimonium tosylate, PEG-25 PABA (p-aminobenzoic acid), polyquaternium-59, TEA-Salicylate, and salts, derivatives, and mixtures thereof. Preferably, phenyl benzimidazole sulfonic acid, telephthalilidene dicamphor sulfonic acid, and salts thereof are exemplified. These may be used alone, or two or more types may be used in combination, but when compounding two or more types of UV absorbers that are the oil agents described above, it is desirable to select only one type of water-soluble UV absorber or reduce the amount of the UV absorber.

The compounding amount of the water-soluble UV absorber in the cosmetic composition of the present invention is not particularly limited, and is preferably from 0.1% to 30% by mass, more preferably from 0.2% to 25% by mass, still more preferably from 0.3% to 20% by mass, and even more preferably 0.3% to 15% by mass, based on the total mass of the cosmetic composition.

[(I) Vinyl-Based Polymer Emulsion]

The cosmetic composition of the present invention may further optionally contain a vinyl-based polymer emulsion such as an acrylic acid/methacrylic acid copolymer or the like. The vinyl-based polymer is a film forming component that forms a cosmetic film on the skin or the like or a water-based thickening agent, or an SPF booster agent, and can improve ultraviolet light blocking properties (in particular, the SPF value) derived from an inorganic ultraviolet light blocking component, which is a hydrophobic powder, by using a combination of the aforementioned carboxylic acid modified silicone (A). When the vinyl-based polymer emulsion (I) is used alone, the effect of boosting the SPF value of the cosmetic composition is limited, and the effect of boosting the SPF value of the cosmetic composition by combining the two is sufficiently exhibited.

The vinyl-based polymer is a polymer or copolymer formed by polymerizing one or two or more types of vinyl-based monomers (monomers) having at least one vinyl copolymerizable functional group, and some of the monomers in the present invention may have a carbosiloxane dendrimer structure.

The vinyl-based polymer emulsion is obtained by preparing an emulsified dispersion in an aqueous medium containing a surfactant by adding a radical polymerization initiator to one type or two or more types of the vinyl-based monomers described above, and performing emulsion polymerization (polymerization reaction or copolymerization reaction). In this emulsion, the vinyl-based polymer is dispersed in the aqueous phase in the form of emulsion particles or latex particles, and the vinyl-based polymer is obtained as a solid by removing water by a drying method or the like.

Specific examples of the vinyl-based monomer include: lower alkyl (meth)acrylates such as methyl (meth)acrylate, ethyl (meth)acrylate, n-propyl (meth)acrylate, and isopropyl (meth)acrylate; glycidyl (meth)acrylate; higher (meth)acrylates such as n-butyl (meth)acrylate, isobutyl (meth)acrylate, tert-butyl (meth)acrylate, n-hexyl (meth)acrylate, cyclohexyl (meth)acrylate, 2-ethylhexyl (meth)acrylate, octyl (meth)acrylate, lauryl (meth)acrylate, and stearyl (meth)acrylate; lower fatty acid vinyl esters such as vinyl acetate and vinyl propionate; higher fatty acid esters such as vinyl butyrate, vinyl caproate, vinyl 2-ethylhexanoate, vinyl laurate, and vinyl stearate; aromatic vinyl-based monomers such styrene, vinyl toluene, benzyl (meth)acrylate, phenoxyethyl (meth)acrylate, and vinyl pyrrolidone; amide group-containing vinyl-based monomers such as (meth)acrylamide, N-methylol (meth)acrylamide, N-methoxymethyl (meth)acrylamide, isobutoxymethoxy (meth)acrylamide, and N,N-dimethyl (meth)acrylamide; hydroxy group-containing vinyl-type monomers such as 2-hydroxyethyl (meth)acrylate, 2-hydroxybutyl (meth)acrylate, and 2-hydroxypropyl (meth)acrylate: fluorine-containing vinyl-type monomers such as trifluoropropyl (meth)acrylate, perfluorobutylethyl (meth)acrylate, and perfluorooctylethyl (meth) acrylate; epoxy group-containing vinyl-type monomers such as glycidyl (meth)acrylate and 3,4 epoxycyclohexylmethyl (meth)acrylate; carboxylic acid-containing vinyl-type monomers such as (meth)acrylic acid, itaconic acid, crotonic acid, fumaric acid, and maleic acid; ether bond-containing vinyl-based monomers such as tetrahydrofurfuryl (meth) acrylate, butoxyethyl (meth)acrylate, ethoxydiethylene glycol (meth)acrylate, polyethylene glycol (meth)acrylate, polypropylene glycol mono(meth)acrylate, hydroxybutyl vinyl ether, cetyl vinyl ether, and 2-ethylhexyl vinyl ether; unsaturated group-containing silicone compounds such as (meth)acryloxypropyl trimethoxysilane, (branched or linear) polydimethyl siloxane containing a (meth)acrylic group at one terminal, and a polydimethyl siloxane containing a styryl group at one terminal; butadiene; vinyl chloride; vinylidene chloride; (meth)acrylonitrile; dibutyl fumarate; maleic anhydride; dodecyl succinic anhydride; (meth) acrylic glycidyl ether; alkali metal salts, ammonium salts, organic amine salts of radically polymerizable unsaturated carboxylic acids such as (meth)acrylic acid, itaconic acid, crotonic acid, fumaric acid, and maleic acid; radical polymerizable unsaturated monomers having sulfonic acid groups such as styrene sulfonic acid, and their alkali metal salts, ammonium salts, organic amine salts; quaternary ammonium salts derived from (meth)acrylic acids, such as 2-hydroxy-3-methacryloxypropyl trimethylammonium chloride, methacrylates of alcohols with tertiary amine groups, such as diethylamine methacrylates, and quaternary ammonium salts thereof.

A polyfunctional vinyl-based monomer can also be used, and examples thereof include trimethylolpropane tri(meth)acrylate, pentaerythritol tri(meth)acrylate, ethylene glycol di(meth)acrylate, tetraethylene glycol di(meth)acrylate, polyethylene glycol di(meth)acrylate, 1,4-butanediol di(meth)acrylate, 1,6-hexanediol di(meth)acrylate, neopentyl glycol di(meth)acrylate, trimethylolpropane trioxyethyl (meth) acrylate, tris(2-hydroxyethyl)isocyanurate di(meth)acrylate, tris(2-hydroxyethyl)isocyanurate tri(meth)acrylate, (meth) acryloyl group-containing monomers such as di(meth)acrylate of diol, ethylene oxide of bisphenol A or adduct of propylene oxide, di(meth)acrylate of diol, ethylene oxide of hydrogenated bisphenol A or adduct of propylene oxide, and triethylene glycol divinyl ether, and unsaturated group-containing silicone compounds such as both-terminal styryl group-blocking polydimethylsiloxane and both-terminal methacryloxypropyl-blocking polydimethylsiloxane.

In addition to these, an organosilicon compound having a vinyl-based radical polymerizable unsaturated group and a hydrolyzable group can also be used. In this case, the film strength becomes hard and water repellency durability is improved, which is preferable. Here, examples of the radically polymerizable group include a (meth)acryloxy group-containing organic group, a (meth)acrylamide group-containing organic group, and a styryl group-containing organic group, as represented by the following general formulas, or an alkenyl group having from 2 to 10 carbon atoms, and a vinyloxy group and an allyloxy group.

The vinyl-based monomer may have a carbosiloxane dendrimer structure, and examples thereof include an acrylic acid ester monomer or a methacrylic acid ester monomer having a carbosiloxane dendrimer structure. Specific examples thereof are the same as Patent Document 4 (PCT International Publication No. WO 2017/061090). Furthermore, the polymerization of the carbosiloxane dendrimers can be produced according to the producing method disclosed in Japanese Unexamined Patent Application Publication No. 11-1530, Japanese Unexamined Patent Application Publication No. 2000-63225, Japanese Unexamined Patent Application Publication No. 2001-192424, Japanese Unexamined Patent Application Publication No. 2014-40512, and the like.

The radical polymerization initiator used in the synthesis of the vinyl polymer is not particularly limited as long as it is a radical polymerization initiator generally used in emulsion polymerization of a vinyl polymer. Examples thereof include water-soluble peroxides such as inorganic peroxides such as potassium persulfate, sodium persulfate, ammonium persulfate, and the like; and organic peroxides such as t-butylperoxymaleic acid, succinic acid peroxide, and t-butylhydroperoxide. If an oil-soluble radical initiator is used, it may be pre-emulsified and then mixed with other ingredients.

The emulsified dispersion is prepared using a general emulsification device. The polymerization temperature and reaction time can be appropriately determined according to the degree of polymerization of the desired vinyl polymer, the type of monomer, the final solid content concentration, and the like. Furthermore, the emulsified dispersion may be polymerized dropwise, or the emulsified dispersion may be charged in a batch and then polymerized, and the manufacturing step thereof is not particularly limited.

The vinyl polymer emulsion of the present invention may be in the form of an emulsion in which emulsified particles of a uniform vinyl polymer or vinyl copolymer are dispersed in an aqueous phase, and may be in the form of an emulsion in which latex particles of a vinyl copolymer having a core-shell structure are emulsified and dispersed in an aqueous phase.

As the vinyl polymer emulsion (I) in the present invention, an emulsion of an acrylic copolymer obtained by copolymerizing an acrylic acid ester monomer or a methacrylic acid monomer is preferable, and the acrylic copolymer may contain a functional group selected from alkyl groups having 6 or more carbon atoms, styrene groups, and carbosiloxane dendron structures, in which a portion of a hydrocarbon group may be substituted with a fluorine or chlorine atom. Furthermore, the polymer may be an acrylic copolymer polymer containing a hydrophilic group such as a hydroxyl group in the molecule.

Examples of the vinyl polymer emulsion (I) of the present invention include emulsions of one or more types of acrylic copolymers selected from (i1) alkyl acrylate/methacrylate copolymers;

(i2) styrene acrylate/methacrylate copolymers; and (i3) acrylic acid/methacrylic acid copolymers having a carbosiloxane dendron structure.

Such component (I) can be synthesized by the above methods, but is commercially available, for example DOWNSIL™ FA4103 ACRYLATE EMULSION sold by Dow Chemical/Dow Toray Co., Ltd.; SOLTEX™ INO POLYMER; EPITEX™ 66 POLYMER; EPITEX™ 99 POLYMER; and LUVIFLEX® SOFT sold by SunSpheres, BASF; and the like. Similarly, as emulsions of styrene acrylate/methacrylate styrene copolymers, commercially available products such as Yodosol GH41 (manufactured by N.S.C. Japan), Syntran 5002 (manufactured by Inter polymer), SunSpheres™ PGL SPF Booster (manufactured by The Dow Chemical Company), and the like can be used.

In the cosmetic composition of the present invention, blending of the vinyl polymer emulsion (I) is optional and is not particularly limited, and a solid fraction of the vinyl polymer excluding water content from the emulsion (hereinafter, referred to as "solid fraction in emulsion") is preferably included within a range of 0.1% to 10% by mass, more preferably within a range of 0.2% to 7.5% by mass, and even more preferably within a range of 0.5% to 5.0% by mass, based on the total mass of the cosmetic composition, in order to improve long lasting properties and SPF value of the cosmetic composition.

In the cosmetic composition of the present invention, in order to improve the long lasting properties and SPF value of the cosmetic composition by the combined use of component (I), the vinyl polymer emulsion (I) is preferably included at an amount within a range of 0.5 to 10 parts by mass, and particularly preferably at an amount within a range in which the solid fraction in the emulsion is within a range of 1.0 to 7.5 parts by mass, relative to 100 parts by mass of the inorganic ultraviolet light blocking agent (D) containing the hydrophobic fine particulate metal oxide. In the range described above, component (D) is stably dispersed in an aqueous phase by the combination of component (A), the water-soluble thickening agent (B), and the vinyl polymer emulsion (I), and the effect of improving the SPF value of the entire cosmetic composition is excellent.

[Optional Components]

Other components ordinarily used in cosmetic compositions can be added to the cosmetic composition of the present invention within a range that does not hinder the effect of the present invention, examples including: hydrophilic powders, moisturizing agents other than component (G), gelling agents, antiseptic agents, antimicrobial agents, perfumes, salts, antioxidants, pH adjusting agents other than component (C), chelating agents, refreshing agents, anti-inflammatory agents, physiologically active components (skin lightening agents, cell activating agents, rough skin improving agents, circulation promoters, skin astringents, anti-seborrheic agents, etc.), vitamins, amino acids, nucleic acids, hormones, inclusion compounds, and the like. Other components are not particularly limited.

The cosmetic composition of the present invention may contain a salt of a saturated or unsaturated fatty acid of at least one higher fatty acid, and specific examples thereof include lauric acid, myristic acid, palmitic acid, stearic acid, behenic acid, undecylenic acid, oleic acid, linoleic acid, linolenic acid, arachidonic acid, eicosapentaenoic acid (EPA), hexyldecanoic acid, docosahexaenoic acid (DHA), isostearic acid, 12-hydroxystearic acid, and the like. Such salts of higher fatty acids are components that also function as emulsifiers.

[Producing Method]

The manufacturing steps of the cosmetic composition of the present invention is optional and is not particularly limited so long as it is possible to prepare a cosmetic composition containing (A) liquid carboxylic acid-modified silicone, (B) a water-soluble thickening agent, (C) a basic compound, (D) an inorganic UV protecting agent containing hydrophobic fine particulate metal oxide, and water, by mixing the aforementioned components.

For example, the cosmetic composition of the present invention can be manufactured, after the step of pre-mixing the inorganic ultraviolet light blocking agent (D) containing hydrophobic fine particulate metal oxide, carboxylic acid-modified silicone (A), and optionally (E) the oil agent and (G) alcohols (such as a slurry composition as a precursor, or the like), emulsifying the mixture obtained by the pre-mixing step using a mechanical force in water, and then further mixing with the (B) water-soluble thickening agent, the (C) basic compound, and residual water. In particular, it is preferable that the use of the (C) basic compound has a structure of an aqueous dispersion in which the hydrophobic powder is dispersed in the aqueous phase at pH 6.5 to 14.0. Note that, among the optional components described above, an oil-based material is preferably added in a pre-mixing step including the (E) oil agent, and an optional water-based material (for example, (H) water-soluble UV absorber) is preferably mixed in water in advance.

[How to Use]

The cosmetic composition of the present invention may be in the form of cream, gel, emulsion, or liquid. For example, the cosmetic composition of the present invention can be used as a base cosmetic composition such as milk, cream, serum, or the like; a base cosmetic composition; a sunscreen agent; and makeup cosmetic compositions such as foundations, eye shadows, eyeliners, and water powders, as well as sunscreen agents for hair and scalp, temporary hair colorants, and the like. Furthermore, the embodiments of the sunscreen cosmetic composition described below are not particularly limited, and can be used in the form of a lotion, liquid, gel, mist spray (including an aerosol type), liquid, solid, oil, foam, or the like.

The cosmetic composition of the present invention can also be used as a precursor for a cosmetic composition (premix or cosmetic raw material).

The cosmetic composition of the present invention can be in the form of a water-soluble composition or an oil-in-water emulsion composition, and the water configuring a continuous phase is in direct contact with the skin. Therefore, a much more fresh feel during use can be provided.

The cosmetic composition of the present invention is preferably a skin cosmetic composition, more preferably applied onto slightly acidic skin, and even more preferably applied onto skin having a pH of 5.1 to 7.0.

Furthermore, when the cosmetic composition of the present invention is applied onto the skin at an application amount of 0.5 mg/cm$^2$, after 30 minutes, the pH of the application surface is preferably 7.0 or lower, and more preferably 6.7 or lower.

The cosmetic composition of the present invention is stable and can form a cosmetic film having excellent water resistance on the skin. Therefore, makeup loss due to sweat, rain, and the like is less likely to occur, and cosmetic durability is excellent.

[Sunscreen Cosmetic Composition]

The cosmetic composition of the present invention, and preferably an oil-in-water emulsion cosmetic composition, can stably disperse a large amount of component (D) in an aqueous phase while taking advantage of the aforementioned advantages such as the texture and the like. Therefore, a cosmetic composition can be designed having a high SPF value, which is an index indicating the degree of the effect of blocking UV-B waves (wavelength: 280 to 315 nm), which is particularly suitable for sunscreen cosmetic compositions.

The SPF value (measured after applying 2 mg of a formulation per cm² onto skin) of the cosmetic composition in the present invention is preferably 5 or higher, and more preferably 25 or higher, and designing the cosmetic composition to have a high SPF value of 30 to 100 is simple. In particular, component (D) can be stably blended in a relatively large amount in the cosmetic composition of the present invention, and therefore, it may be possible to provide a cosmetic composition with an SPF value of 50 to 80 without impairing the texture of the cosmetic.

The oil-in-water emulsion cosmetic composition of the present invention can design a sunscreen cosmetic composition that is excellent in the PA index (abbreviation of Protection grade of UVA) as an index of the degree of effect of blocking UV-A waves (wavelength 315 to 380 nm) by selecting the component (D), the component (H), and other organic UV absorbers. Specifically, by using a diethylaminohydroxybenzoyl hexyl benzoate (registered trademark Uvinul A, BASF Japan), or the like, which is a UV absorber active in a UV-A region, in combination, it is possible to design sunscreen cosmetic compositions having a PA index of + (effective) or higher, and preferably PA ++ or higher.

As described above, even if the cosmetic composition of the present invention is derived from component (D) and contains a hydrophobic fine particulate metal oxide or a water-soluble component derived therefrom in an aqueous phase, a reduction in viscosity of a formulation is less likely to occur, and stability and water resistance of a cosmetic film are excellent. Therefore, when used as a sunscreen cosmetic composition, makeup loss due to sweat, rain, and the like is less likely to occur, and cosmetic durability is excellent, in addition to providing a high ultraviolet light blocking effect. Furthermore, since the component (A) can be easily cleaned with an alkaline soap or the like, the present invention has the advantage of having excellent water resistance and makeup retention, and since the sunscreen cosmetic composition can be easily washed out with soap or the like, it also has the advantage that it is less likely to cause problems of skin irritation and sensitization during long-term use.

EXAMPLES

Hereinafter, the present invention will be described in more detail based on examples, but the present invention is not limited to these examples. The compounding amount of each component is "% by mass" ("wt %") unless otherwise specified.

carboxylic acid-modified silicone (compound 1), which is a component (A) of the present invention, was synthesized by the following method.

Synthesis Example 1

In a flask equipped with a stirrer, a reflux condenser, a dropping funnel, and a thermometer, 230.67 g of trimethylsilyl undecylenate and 0.042 g of platinum-1,3-divinyl-1,1,3,3-tetramethyldisiloxane complex were added, and then 129.33 g of Si—H siloxane represented by the following general formula was added dropwise while keeping a temperature range of 70° C. to 80° C.

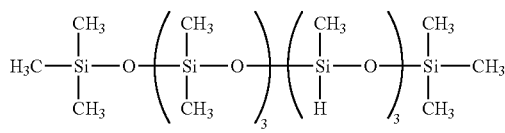

After dropping was complete, the mixture was aged for 2 hours at 110° C., and then the disappearance of the Si—H bond was confirmed by a hydrogen generation method. The low boiling point content was distilled off under reduced pressure. Thereafter, 90 g of deionized water was added, aged at reflux for 4 hours, and deprotection was performed. Thereafter, the low boiling point content was again removed under reduced pressure to obtain a compound 1. As a result of the analysis, it was confirmed that it was the compound 1 represented by the following chemical structural formula.

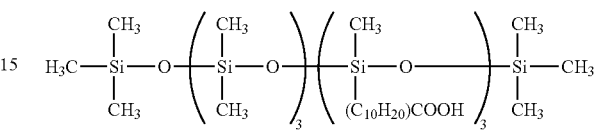

Synthesis Example 2

In a flask equipped with a stirrer, a reflux condenser, a dropping funnel, and a thermometer, 100 g of 1,1,1,3,5,5,5-heptamethyltrisiloxane, and 0.02 g of toluene solution of platinum-1,3-divinyl-1,1,3,3-tetramethyldisiloxane complex were added, and 105 g of trimethylsilyl undecylenate was added dropwise while keeping a temperature range of 70° C. to 100° C. After dropping was complete, the mixture was aged for 2 hours at 110° C., and then the disappearance of the Si—H bond was confirmed by a hydrogen generation method. The low boiling point content was distilled off under reduced pressure. Thereafter, water was added, aged at reflux for 4 hours, and deprotection was performed. Thereafter, the low boiling point content was again removed under reduced pressure to obtain a compound 2. As a result of the analysis, it was confirmed that the chemical structure of the compound 2 expressed by the following chemical formula.

[Formula 3]

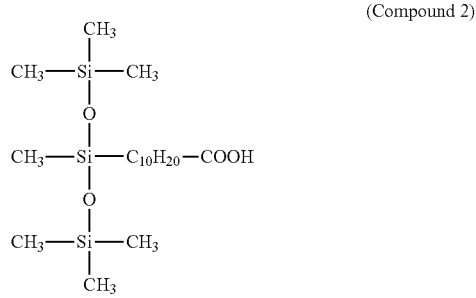

(Compound 2)

Preparation and Evaluation of Aqueous Dispersion: Examples 1 to 8, Comparative Examples 1 to 10

The components of phase A shown in Tables 1 to 4 below were inserted into a mayonnaise bottle, and 160 g of zirconia beads (YTZ ball, φ0.8 mm) were further inserted. Dispersion was performed in a paint shaker, and the beads were separated (mixture (1)).

The components of phase B were inserted in a separate beaker, and mixture (1) was added while stirring with a three-one motor to obtain aqueous dispersions of Examples 1 to 8 and Comparative Examples 1 to 10.

The aqueous dispersions were evaluated by the following methods, and the results are shown in the tables. Note that the pH of each aqueous dispersion was measured at room temperature using a pH test paper.

[Appearance Evaluation for Aqueous Dispersion]

The appearance of the aqueous dispersion was observed immediately after preparation and after 3 months of storage at room temperature.

○: Favorable dispersion condition, gel to creamy dispersion

Δ: Emulsion with favorable dispersion but low viscosity x: Reduced viscosity and fine particulate powders settled and separated.

[Water Repellency Test]

Each of the aqueous dispersions in Tables 1 to 4 was applied to BIOSKIN manufactured by Beaulax Co., Ltd., spread thinly, and dried at 40° C. for 1 hour. 2 µL of water was gently dripped on a surface of a coating film after drying, and the state of the water droplets formed on the surface was observed.

○: Water droplets were maintained in hemisphere shape

X: Water droplets spread

[Water Resistance Test]

Each of the aqueous dispersions in Tables 1 to 4 was applied to BIOSKIN manufactured by Beaulax Co., Ltd., spread thinly, and dried at 40° C. for 1 hour. The strength of the coating film was checked after tap water was poured over the dried coating surface for 10 seconds.

○: No change in coating film

X: Coating film was collapsed

[Sebum Resistance Test]

Each of the aqueous dispersions in Tables 1 to 4 was applied to BIOSKIN manufactured by Beaulax Co., Ltd., spread thinly, and dried at 40° C. for 1 hour. An artificial sebum (weight ratio of triolein:oleic acid:squalane=3:1:1) was gently dropped on the surface of the coating film after drying with a dropper. The strength of the coating film was confirmed by rotating 10 times while pressing the liquid droplet with a finger wearing a nitrile glove.

○: No change in coating film

X: Coating film dissolved and collapsed

TABLE 1

| Phase | Component | Example 1 | Comparative Example 1 | Comparative Example 2 | Comparative Example 3 |
|---|---|---|---|---|---|
| A | Carboxylic acid-modified silicone (Compound 1) | 2 | — | — | — |
| | Carboxylic acid-modified silicone (Compound 2) | — | 2 | — | — |
| | Polyether-modified silicone (Note 1) | — | — | 2 | — |
| | Isostearic acid (Note 2) | — | — | — | 2 |
| | Hydrophobic zinc oxide (Note 3) | 12 | 12 | 12 | 12 |
| | Aminomethyl propanol | 0.57 | 0.48 | — | 0.69 |
| | Ion exchanged water | 16 | 16 | 16 | 16 |
| | 1,3-butanediol | 10 | 10 | 10 | 10 |
| B | 2% Carboxyvinyl polymer (Note 4) | 133 | 133 | 133 | 133 |
| | Ion exchanged water | 266 | 266 | 266 | 266 |
| | 10% KOH aqueous solution | — | — | Appropriate amount | — |
| | Evaluation results | | | | |
| | pH | 7 | 5.5 | 7 | 7 |
| | Appearance of aqueous dispersion (immediately after preparation) | ○ | Δ | x | ○ |
| | Appearance of aqueous dispersion (after 3 months at room temperature) | ○ | x | x | ○ |
| | Water repellency test | ○ | ○ | — | x |
| | Water resistance test | ○ | Δ | — | Δ |
| | Sebum resistance test | ○ | Δ | — | x |

(Note 1)
PEG-12 dimethicone
(Note 2)
Trade name: Isostearic acid EX (available from Kokyu Alcohol Kogyo Co., Ltd.)
(Note 3)
Trade name: FINEX-30S-LPT (available from Sakai Chemical Industry Co., Ltd.)
(Note 4)
Trade name: Carbopol 980 (available from Lubrizol Corporation)

TABLE 2

| Phase | Component | Example 2 | Comparative Example 4 | Comparative Example 5 | Comparative Example 6 |
|---|---|---|---|---|---|
| A | Carboxylic acid-modified silicone (Compound 1) | 2 | — | — | — |
| | Carboxylic acid-modified silicone (Compound 2) | — | 2 | — | — |
| | Polyether-modified silicone (Note 1) | — | — | 2 | — |
| | Isostearic acid (Note 2) | — | — | — | 2 |
| | Hydrophobic zinc oxide (Note 3) | 12 | 12 | 12 | 12 |
| | Aminomethyl propanol | 0.57 | 0.48 | — | 0.69 |
| | Ion exchanged water | 16 | 16 | 16 | 16 |
| | 1,3-butanediol | 10 | 10 | 10 | 10 |
| B | 2% Alkyl acrylate/methacrylate copolymer (Note 5) | 133 | 133 | 133 | 133 |
| | Ion exchanged water | 266 | 266 | 266 | 266 |
| | 10% KOH aqueous solution | — | — | Appropriate amount | — |
| | Evaluation results | | | | |
| | pH | 6.5 | 6 | 7 | 7 |
| | Appearance of aqueous dispersion (immediately after preparation) | ○ | ○ | x | ○ |
| | Appearance of aqueous dispersion (after 3 months at room temperature) | ○ | ○ | x | ○ |
| | Water repellency test | ○ | ○ | — | Δ |
| | Water resistance test | ○ | Δ | — | x |
| | Sebum resistance test | ○ | Δ | — | x |

(Notes 1 to 4)
Refer to Table 1
(Note 5)
Trade name: Carbopol Ultrez 21 polymer (available from Lubrizol Corporation)

TABLE 3

| Phase | Component | Example 3 | Comparative Example 7 | Comparative Example 8 | Example 4 | Comparative Example 9 | Comparative Example 10 |
|---|---|---|---|---|---|---|---|
| A | Carboxylic acid-modified silicone (Compound 1) | 2 | — | 2 | 2 | — | — |
| | Carboxylic acid-modified silicone modified silicone (Compound 2) | — | 2 | — | — | 2 | — |
| | Isostearic acid (Note 2) | — | — | 2 | — | — | 2 |
| | Hydrophobic zinc oxide (Note 6) | 12 | 12 | 12 | 12 | 12 | 12 |
| | Aminomethyl propanol | 0.57 | 0.48 | 0.69 | 0.57 | 0.48 | 0.69 |
| | Ion exchanged water | 16 | 16 | 16 | 16 | 16 | 16 |
| | 1,3-butanediol | 10 | 10 | 10 | 10 | 10 | 10 |
| B | 2% Carboxyvinyl polymer (Note 4) | 133 | 133 | 133 | | | |
| | 2% Alkyl acrylate/methacrylate copolymer (Note 5) | | | | 133 | 133 | 133 |
| | Ion exchanged water | 266 | 266 | 266 | 266 | 266 | 266 |
| | Evaluation results | | | | | | |
| | pH | 5.5 | 5 | 5.5 | 5.5 | 5 | 5.5 |
| | Appearance of aqueous dispersion (immediately after preparation) | ○ | ○ | ○ | ○ | ○ | ○ |
| | Appearance of aqueous | | | | | | |

TABLE 3-continued

| Phase | Component | Example 3 | Comparative Example 7 | Comparative Example 8 | Example 4 | Comparative Example 9 | Comparative Example 10 |
|---|---|---|---|---|---|---|---|
| | dispersion (after 3 months at room temperature) | ○ | x | ○ | ○ | x | x |
| | Water repellency test | ○ | ○ | Δ | ○ | ○ | ○ |
| | Water resistance test | ○ | Δ | x | ○ | x | x |
| | Sebum resistance test | ○ | x | Δ | ○ | Δ | x |

(Notes 1 to 4)
Refer to Table 1,
(Note 5)
Refer to Table 2
(Note 6)
Trade name: FINEX-30S-OTS (available from Sakai Chemical Industry Co., Ltd.)

TABLE 4

| Phase | Component | Example 5 | Example 6 | Example 7 | Example 8 |
|---|---|---|---|---|---|
| A | Carboxylic acid-modified silicone (Compound 1) | 2 | 2 | 2 | 2 |
| A | Hydrophobic zinc oxide (Note 3) | 12 | 12 | 12 | 12 |
| A | Aminomethyl propanol | 0.57 | 0.57 | 0.57 | 0.57 |
| A | Ion exchanged water | 16 | 16 | 16 | 16 |
| A | 1,3-butanediol | 10 | 10 | 10 | 10 |
| B | Acrylate copolymer aqueous dispersion (Note 7) | 34.67 | | | |
| B | Acrylate copolymer aqueous dispersion (Note 8) | | 35.73 | | |
| B | Acrylate copolymer aqueous dispersion (Note 9) | | | 13.33 | |
| B | Acrylate copolymer aqueous dispersion (Note 10) | | | | 18.93 |
| B | 10% KOH aqueous solution | Appropriate amount | Appropriate amount | Appropriate amount | Appropriate amount |
| B | Ion exchanged water | 365 | 364 | 387 | 381 |
| | Evaluation results | | | | |
| pH | | 5.5 | 5 | 5.5 | 5.5 |
| Appearance of aqueous dispersion (immediately after preparation) | | ○ | ○ | ○ | ○ |
| Appearance of aqueous dispersion (after 3 months at room temperature) | | ○ | ○ | ○ | ○ |

(Notes 1 to 4)
Refer to Table 1,
(Note 5)
Refer to Table 2,
(Note 6)
Refer to Table 3
(Note 7)
ACULYN™ EXCEL RHEOLOGY MODIFIER (available from The Dow Chemical Company)
(Note 2)
ACULYN™ 22 RHEOLOGY MODIFIER (available from The Dow Chemical Company)
(Note 9)
ACULYN™ 28 POLYMER (available from The Dow Chemical Company)
(Note 10)
ACULYN™ 33A RHEOLOGY MODIFIER (available from The Dow Chemical Company)

Summary of Tables 1 to 4

All of the aqueous dispersions containing hydrophobic zinc oxide fine particles of Examples 1 to 4 maintained a favorable dispersion condition for 3 months at room temperature, and were confirmed to form a cosmetic film having excellent water repellency, water resistance and sebum resistance. On the other hand, comparative experiments in which component (A) in these examples was replaced with another carboxylic acid modified silicone, polyether modified silicone, which is a conventionally known surfactant, or isostearic acid resulted in inferior stable dispersion conditions, water resistance of a film, and the like. Note that in Examples 5 to 8, in which an acrylate copolymer aqueous dispersion was used as component (B), an aqueous dispersion having a favorable dispersion condition could also be obtained.

Oil-in-Water Sunscreen Cosmetic Composition: Examples 9 to 14

Sunscreen cosmetic compositions containing a phase inversion type emulsifying thickening agent were adjusted in accordance based on formulations shown in Tables 5 and 6 below, and the dispersion stability (appearance) and cosmetic film performance thereof were evaluated based on the following criteria. Note that the name of each component, the name of the product used in the formulation, and the supplier are listed in Tables 5 and 6.

[Water Repellency Test]

Each of the aqueous dispersions in Tables 1 to 4 was applied to BIOSKIN manufactured by Beaulax Co., Ltd., spread thinly, and dried at 40° C. for 1 hour. 20 μL of water was gently dripped on a surface of a coating film after drying, and the state of the water droplets formed on the surface was observed.

◯: Water droplets were maintained in hemisphere shape
X: Water droplets spread

[Water Resistance Test]

Each of the aqueous dispersions in Tables 1 to 4 was applied to BIOSKIN manufactured by Beaulax Co., Ltd., spread thinly, and dried at 40° C. for 1 hour. The strength of the coating film was checked after tap water was poured over the dried coating surface for 10 seconds.

◯: No change in coating film
X: Coating film was collapsed

[Sebum Resistance Test]

Each of the aqueous dispersions in Tables 1 to 4 was applied to BIOSKIN, spread thinly, and dried at 40° C. for 1 hour. An artificial sebum (weight ratio of triolein:oleic acid:squalane=3:1:1) was gently dropped on the surface of the coating film after drying with a dropper. The strength of the coating film was confirmed by rotating 10 times while pressing the liquid droplet with a finger wearing a nitrile glove.

◯: No change in coating film
X: Coating film dissolved and collapsed

TABLE 5

| Phase | Component | Product name abbreviation | Supplier | Example 9 | Example 10 | Example 11 | Example 12 |
|---|---|---|---|---|---|---|---|
| A | Emulsifier premix | SEPIGEL 305 | SEPPIC | 1.5 | 1.5 | 1.5 | 1.5 |
| | ethylhexyl methoxy-cinnamate | Uvinul MC80N | BASF | 7.5 | 7.5 | 7.5 | 7.5 |
| | Caprylyl methicone | DOWSIL™ FZ-3196 | DOW | 3 | 3 | 3 | 3 |
| | Cyclopenta-siloxane | XIAMETER® PMX-0245 | DOW | 2 | 2 | 2 | 2 |
| B | 1,3-butanediol | | | 3 | 3 | 3 | 3 |
| | Phenoxyethanol | | | 0.9 | 0.9 | 0.9 | 0.9 |
| | Purified water | | | 67.1 | 67.1 | 67.1 | 67.1 |
| C | Carboxylic acid-modified silicone (Compound 1) | | | 0.75 | 0.75 | 0.38 | 0.75 |
| | Zinc oxide | FINEX-30S-LPT | Sakai Chemical Industry Co., Ltd. | 4.5 | | 4.5 | |
| | Zinc oxide | FINEX-30S-OTS | Sakai Chemical Industry Co., Ltd. | | | | 4.5 |
| | Titanium oxide | MTY-02 | TAYCA | | 4.5 | | |
| | 1,3-butanediol | | | 3.75 | 3.75 | 3.75 | 3.75 |
| | AMP (Aminomethyl-propanol) | | | 0.09 | 0.09 | 0.09 | 0.09 |
| | Purified water | | | 6 | 6 | 6 | 6 |
| | Appearance immediately after production | | | Uniform cream | Uniform cream | Uniform cream | Uniform cream |
| | Appearance after 5 months of storage at room temperature | | | Slight decrease in viscosity, but no separation or other problems | Slight decrease in viscosity, but no separation or other problems | Slight decrease in viscosity, but no separation or other problems | Slight decrease in viscosity, but no separation or other problems |

TABLE 5-continued

| Phase | Component | Product name abbreviation | Supplier | Example 9 | Example 10 | Example 11 | Example 12 |
|---|---|---|---|---|---|---|---|
| | Water repellency test | | | ○ | ○ | ○ | — |
| | Sebum resistance test | | | ○ | ○ | ○ | — |
| | Water resistance test | | | ○ | ○ | ○ | — |

(Producing Method)
1. Phase A is mixed.
2. Phase B is mixed.
3. Phase C is mixed.
4. Phase B is slowly added while stirring Phase A. (AB phase)
5. Phase C is added to the Phase AB and then stirred until uniform.

TABLE 6

| Phase | Component | Product name abbreviation | Supplier | Example 13 | Example 14 |
|---|---|---|---|---|---|
| A | Emulsifier premix | ACULYN™ RM 2051 THICKENING AGENT | DOW | 1.5 | 1.5 |
| | ethylhexyl methoxycinnamate | Uvinul MC80N | BASF | 7.5 | 7.5 |
| | Caprylyl methicone | DOWSIL™ FZ-3196 | DOW | 3 | 3 |
| | Cyclopentasiloxane | XIAMETER® PMX-0245 | DOW | 2 | 2 |
| B | 1,3-butanediol | | | 3 | 3 |
| | Phenoxyethanol | | | 0.9 | 0.9 |
| | Purified water | | | 67.1 | 67.1 |
| C | Carboxylic acid-modified silicone (Compound 1) | | | 0.75 | 0.75 |
| | Zinc oxide | FINEX-30S-LPT | Sakai Chemical Industry Co., Ltd. | 4.5 | |
| | Zinc oxide | FINEX-30S-OTS | Sakai Chemical Industry Co., Ltd. | | 4.5 |
| | 1,3-butanediol | | | 3.75 | 3.75 |
| | AMP | | | 0.09 | 0.09 |
| | Purified water | | | 6 | 6 |
| Appearance immediately after production | | | | Uniform cream | Uniform cream |
| Appearance after 5 months of storage at room temperature | | | | No change from initial stage | Slight decrease in viscosity, but no separation or other problems |
| Water repellency test | | | | ○ | ○ |
| Sebum resistance test | | | | ○ | ○ |
| Water resistance test | | | | ○ | ○ |

(Producing Method)
1. Phase A is mixed.
2. Phase B is mixed.
3. Phase C is mixed.
4. Phase B is slowly added while stirring Phase A. (AB phase)
5. Phase C is added to the Phase AB and then stirred until uniform.

As indicated in Examples 9 to 14, an oil-in-water type sunscreen cosmetic composition with hydrophobic zinc oxide fine particles stably dispersed in an aqueous phase could be obtained even when the phase inversion type emulsifying thickening agent SEPIGEL or RM2051 was used, and the sunscreen cosmetic composition provided a cosmetic film having excellent water resistance and the like.

Oil-in-Water Sunscreen Cosmetic Composition: Examples 15 to 28

Sunscreen cosmetic compositions containing carbomer (water-soluble thickening agent) were adjusted in accordance with the formulations shown in Tables 7 to 10 below, and the dispersion stability (appearance) thereof was evaluated. As shown in the tables, even when carbomer was used, it was possible to obtain oil-in-water sunscreen cosmetic compositions in which hydrophobic zinc oxide fine particles or hydrophobic titanium dioxide fine particles were stably dispersed in an aqueous phase.

TABLE 7

| Phase | Component | Product name abbreviation | Supplier | Example 15 | Example 16 |
|---|---|---|---|---|---|
| A | Silicone emulsifier premix | DOWSIL ™ FB-2540 EMULSIFIER BLEND | DOW | 10 | 10 |
| | Trilaureth-4 phosphate | Hostaphat KL340D | Clariant | 0.05 | 0.05 |
| | Phenyl trimethicone | DOWSIL ™ 556 Cosmetic Grade Fluid | DOW | 2 | 2 |
| | Caprylyl methicone | DOWSIL ™ FZ-3196 | DOW | 3 | 3 |
| | ethylhexyl methoxycinnamate | Uvinul MC80N | BASF | 6.7 | 6.7 |
| | Diethylaminohydroxy benzoyl hexyl benzoate | Uvinul A Plus | BASF | 3.3 | 3.3 |
| B | Carbomer | 2% Carbopol 980 aqueous solution | Lubrizol | 15 | 15 |
| | Purified water | | | 20.3 | 20.3 |
| | Na hydroxide | 1% sodium hydroxide aqueous solution | | 15.75 | 15.75 |
| | 1,3-butanediol | | | 3 | 3 |
| | Glycerin | | | 5 | 5 |
| | Phenoxyethanol | | | 0.9 | 0.9 |
| C | Carboxylic acid-modified silicone (Compound 1) | | | 0.75 | 0.75 |
| | Zinc oxide | FINEX-30S-LPT | Sakai Chemical Industry Co., Ltd. | 4.5 | |
| | Titanium oxide | MTY-02 | TAYCA | | 4.5 |
| | 1,3-butanediol | | | 3.75 | 3.75 |
| | AMP | | | 0.09 | 0.09 |
| | Purified water | | | 6 | 6 |
| Appearance immediately after production | | | | Uniform cream | Uniform cream |
| Appearance after 5 months of storage at room temperature | | | | Slight decrease in viscosity, but no separation or other problems | Slight decrease in viscosity, but no separation or other problems |

(Producing Method)
1. Phase A is mixed.
2. Phase B is mixed.
3. Phase C is mixed.
4. Phase A is slowly added while stirring Phase B. (Phase AB)
5. Phase C is added to Phase AB and then mixed until uniform.

TABLE 8

| Phase | Component | Product name abbreviation | Supplier | Example 17 | Example 18 | Example 19 | Example 20 |
|---|---|---|---|---|---|---|---|
| A | Polysorbate 80 | TWEEN 80 | CRODA | 1 | 1 | 1 | 1 |
| | Mineral oil | HICALL K-230 | KANEDA Co., Ltd. | 10 | 10 | 10 | 10 |
| | Triethylhexanoin | IOTG | Nippon Fine Chemical Co., Ltd. | 5 | 5 | 5 | 5 |
| | Caprylyl methicone | DOWSIL ™ FZ-3196 | DOW | 10 | 10 | 10 | 10 |
| | Cyclopentasiloxane | XIAMETER ® PMX-0245 | DOW | 5 | 5 | 5 | 5 |

TABLE 8-continued

| Phase | Component | Product name abbreviation | Supplier | Example 17 | Example 18 | Example 19 | Example 20 |
|---|---|---|---|---|---|---|---|
| | ethylhexyl methoxycinnamate | Uvinul MC8ON | BASF | 7.5 | 7.5 | 7.5 | 7.5 |
| | Diethylaminohydroxy benzoyl hexyl benzoate | Uvinul A Plus | BASF | 2.5 | 2.5 | 2.5 | 2.5 |
| B | Carbomer | 2% Carbopol 980 aqueous solution | Lubrizol | 15 | 15 | 15 | 15 |
| | Purified water | | | 10.05 | 10.05 | 10.05 | 10.05 |
| | Na hydroxide | 1% sodium hydroxide aqueous solution | | 15.75 | 15.75 | 15.75 | 15.75 |
| | 1,3-butanediol | | | 2 | 2 | 2 | 2 |
| | Glycerin | | | 2 | 2 | 2 | 2 |
| | Phenoxyethanol | | | 0.9 | 0.9 | 0.9 | 0.9 |
| C | Carboxylic acid-modified silicone (Compound 1) | | | 0.67 | 0.67 | 0.34 | 0.67 |
| | Zinc oxide | FINEX-30S-LPT | Sakai Chemical Industry Co., Ltd. | 4 | | 4 | |
| | Zinc oxide | FINEX-30S-OTS | Sakai Chemical Industry Co., Ltd. | | | | 4 |
| | Titanium oxide | MTY-02 | TAYCA | | 4 | | |
| | 1,3-butanediol | | | 3.3 | 3.3 | 3.3 | 3.3 |
| | AMP | | | 0.08 | 0.08 | 0.08 | 0.08 |
| | Purified water | | | 5.3 | 5.3 | 5.3 | 5.3 |
| | Appearance immediately after production | | | Uniform cream | Uniform cream | Uniform cream | Uniform cream |
| | Appearance after 5 months of storage at room temperature | | | No change from initial stage | No change from initial stage | No change from initial stage | No change from initial stage |

(Producing Method)
1. Phase A is mixed and heated to 70° C.
2. Phase B is mixed and heated to 70° C.
3. Phase C is mixed.
4. Phase A is slowly added while stirring Phase B. (AB phase)
5. The Phase AB is cooled while stirring until the temperature thereof reaches 35° C. or lower.
6. Phase C is added to the Phase AB and then mixed until uniform.

TABLE 9

| Phase | Component | Product name abbreviation | Supplier | Example 21 | Example 22 | Example 23 | Example 24 |
|---|---|---|---|---|---|---|---|
| A | ethylhexyl methoxycinnamate | Uvinul MC8ON | BASF | 7.5 | 7.5 | 7.5 | 7.5 |
| | Diethylamino-hydroxybenzoyl hexyl benzoate | Uvinul A Plus | BASF | 2 | 2 | 2 | 2 |
| | Isotridecyl isononanoate | Crodamol TN-LQ | CRODA | 13.2 | 13.2 | 13.2 | 13.2 |
| | Cyclopentasiloxane | XIAMETER® PMX-0245 | DOW | 3 | 3 | 3 | 3 |
| | Behenyl alcohol | NIKKOL Behenyl alcohol | Nikko Chemicals Co., Ltd. | 0.7 | 0.7 | 0.7 | 0.7 |
| | Polyglyceryl distearate 10 | NIKKOL Decaglyn 2-SV | Nikko Chemicals Co., Ltd. | 1.6 | 1.6 | 1.6 | 1.6 |
| B | Carbomer | 2% Carbopol 980 aqueous solution | Lubrizol | 5 | 5 | 5 | 5 |
| | (Acrylates/alkyl acrylate (C10-30)) crosspolymer | 2% Carbopol Ultrez 21 polymer aqueous solution | Lubrizol | 5 | 5 | 5 | 5 |

TABLE 9-continued

| Phase | Component | Product | name abbreviation | Supplier | Example 21 | Example 22 | Example 23 | Example 24 |
|---|---|---|---|---|---|---|---|---|
| | | Triethanolamine | | DOW | 0.2 | 0.2 | 0.2 | 0.2 |
| | | 1,3-butanediol | | | 5 | 5 | 5 | 5 |
| | | Alcohol | Ethanol | | 5 | 5 | 5 | 5 |
| | | Purified water | | | 41.8 | 41.8 | 41.8 | 41.8 |
| C | | Carboxylic acid-modified silicone (Compound 1) | | | 0.5 | 0.5 | 0.25 | 0.5 |
| | | Zinc oxide | FINEX-30S-LPT | Sakai Chemical Industry Co., Ltd. | | 3 | | 3 |
| | | Zinc oxide | FINEX-30S-OTS | Sakai Chemical Industry Co., Ltd. | | | | 3 |
| | | Titanium oxide | MTY-02 | TAYCA | | 3 | | |
| | | 1,3-butanediol | | | 2.5 | 2.5 | 2.5 | 2.5 |
| | | AMP | | | 0.06 | 0.06 | 0.06 | 0.06 |
| | | Purified water | | | 4 | 4 | 4 | 4 |
| | Appearance immediately after production | | | | Uniform cream | Uniform cream | Uniform cream | Uniform cream |
| | Appearance after 5 months of storage at room temperature | | | | No change from initial stage | No change from initial stage | No change from initial stage | No change from initial stage |

(Producing Method)
1. Phase A is mixed and heated to 75° C.
2. Phase B is mixed and heated to 75° C.
3. Phase C is mixed.
4. Phase A is slowly added while stirring Phase B. (AB phase)
5. The Phase AB is cooled while stirring until the temperature thereof reaches 35° C. or lower.
6. Phase C is added to the Phase AB and then mixed until uniform.

TABLE 10

| Phase | Component | Product name abbreviation | Supplier | Example 25 | Example 26 | Example 27 | Example 28 |
|---|---|---|---|---|---|---|---|
| A | Carboxylic acid-modified silicone (Compound 1) | | | 0.85 | 0.85 | 0.85 | 0.85 |
| | Polysorbate 80 | Tween 80 | CRODA | 1.02 | 1.02 | 1.02 | 1.02 |
| | Sorbitan sesquistearate | EMALEX SPO-150 | NIHON EMULSION Co., Ltd. | 0.43 | 0.43 | 0.43 | 0.43 |
| | Glyceryl stearate | RHEODOL MS-50 | Kao Corporation | 1.28 | 1.28 | 1.28 | 1.28 |
| | Behenyl alcohol | NIKKOL Behenyl alcohol | Nikko Chemicals Co., Ltd. | 2.13 | 2.13 | 2.13 | 2.13 |
| | Dimethicone | XIAMETER ® PMX-200 Fluid 5 cs | DOW | 4.25 | 4.25 | 4.25 | 4.25 |
| | Squalene | | | 4.25 | 4.25 | 4.25 | 4.25 |
| | Isotridecyl isononanoate | CRODAMOL TN-LQ | CRODA | 4.25 | 4.25 | 4.25 | 4.25 |
| | Tri (capric acid/caprylic acid) glyceryl | CRODAMOL GTCC | CRODA | 4.25 | 4.25 | 4.25 | 4.25 |
| | Purified water | | | 34.26 | 34.26 | 34.26 | 34.26 |
| | 1,3-butanediol | | | 6.80 | 6.80 | 6.80 | 6.80 |
| B | Na hydroxide | 1% sodium hydroxide aqueous solution | | 12.75 | 12.75 | 12.75 | 12.75 |
| | Carbomer | 2% Carbopol 980 aqueous solution | Lubrizol | 8.50 | 8.50 | 8.50 | 8.50 |
| | Carboxylic acid modified silicone (Compound 1) | | | 0.75 | 0.75 | 0.38 | 0.75 |

TABLE 10-continued

| Phase | Component | Product name abbreviation | Supplier | Example 25 | Example 26 | Example 27 | Example 28 |
|---|---|---|---|---|---|---|---|
| | Zinc oxide | FINEX-30S-LPT | Sakai Chemical Industry Co., Ltd. | 4.5 | | 4.5 | |
| C | Zinc oxide | FINEX-30S-OTS | Sakai Chemical Industry Co., Ltd. | | | | 4.5 |
| | Titanium oxide | MTY-02 | TAYCA | | 4.5 | | |
| | 1,3-butanediol | | | 3.75 | 3.75 | 3.75 | 3.75 |
| | AMP | | | 0.09 | 0.09 | 0.09 | 0.09 |
| | Purified water | | | 6 | 6 | 6 | 6 |
| | Appearance immediately after production | | | Uniform cream | Uniform cream | Uniform cream | Uniform cream |
| | Appearance after 1 month of storage at 50° C. | | | No change from initial stage | No change from initial stage | No change from initial stage | No change from initial stage |

(Producing Method)
1. Phase A is mixed and heated to 75° C.
2. Phase B is mixed and heated to 75° C.
3. Phase C is mixed.
4. Phase A is slowly added while stirring Phase B.
5. The Phase AB is cooled while stirring until the temperature thereof reaches 35° C. or lower.
6. Phase C is added to the Phase AB and then mixed until uniform.

Summary

As indicated in Examples 1 to 28, by using a carboxylic acid modified silicone (compound 1) in combination with carbomer (carboxyvinyl polymer), an acrylate copolymer, SEPIGEL or ACULYN™ RM2051, and the like, it was possible to obtain cosmetic compositions (in particular, oil-in-water sunscreen cosmetic compositions) containing hydrophobic zinc oxide fine particles or hydrophobic titanium dioxide fine particles, in which conventionally it was difficult to form a stable aqueous dispersion, and in which these ultraviolet light blocking components are stably dispersed in an aqueous phase. As indicated in the comparative examples, the same cosmetic compositions could not be obtained with carboxylic acid modified silicones other than a carboxylic acid modified silicone (compound 1) having a specific structure, and the like. The present invention is expected to further expand the degree of freedom in designing a formulation for a cosmetic composition containing hydrophobic zinc oxide fine particles or hydrophobic titanium dioxide fine particles, in which it has previously been difficult to form stable aqueous dispersions, and to enable the design of a cosmetic composition with excellent ultraviolet light blocking performance, appearance, storage stability and feel during use.

The invention claimed is:
1. A cosmetic composition, comprising:
(A) a carboxylic acid modified silicone that is liquid at room temperature and has the following formula:

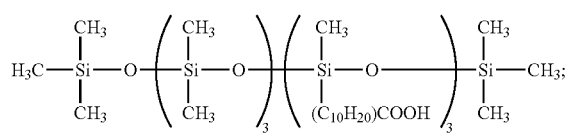

(B) a water-soluble thickening agent;
(C) a basic compound; and
(D) an inorganic ultraviolet light blocking agent comprising a hydrophobic fine particulate metal oxide;
wherein component (B) comprises one or more types of water-soluble thickening agents selected from the group consisting of:
(b1) carboxyvinyl polymers;
(b2) acrylic acid copolymers or salts thereof;
(b3) alkyl acrylate/methacrylate polyoxyethylene copolymers;
(b4) polyacrylamides; and
(b5) water-soluble natural polysaccharide polymers;
wherein component (D) has a dispersed structure in an aqueous phase; and
wherein component (D) comprises: (D1) a hydrophobized fine particulate titanium oxide or hydrophobized fine particulate zinc oxide with an average particle diameter within a range of 1 to 200 nm.

2. The cosmetic composition according to claim 1, wherein component (B) comprises one or more types of water-soluble thickening agents selected from the group consisting of:
(b1) carboxyvinyl polymers;
(b2) acrylic acid copolymers or salts thereof; and
(b3) alkyl acrylate/methacrylate polyoxyethylene copolymers.

3. The cosmetic composition according to claim 1, wherein component (D) comprises: (D1-1) a hydrophobized fine particulate zinc oxide with an average particle diameter within a range of 1 to 200 nm.

4. The cosmetic composition according to claim 1, wherein component (D) is blended into the cosmetic composition in a form of a powder dispersion that has been mixed in advance with all or a portion of component (A).

5. The cosmetic composition according to claim 1, further comprising: (E) an oil agent.

6. The cosmetic composition according to claim 5, wherein the component (E) comprises at least one type of ultraviolet light absorber.

7. The cosmetic composition according to claim 1, which is an oil-in-water emulsified cosmetic composition.

8. The cosmetic composition according to claim 1, further comprising one or more types of components selected from the group consisting of (F) oil-soluble film-forming agents, (G) alcohols, (H) water-soluble ultraviolet light absorbers, and (I) vinyl-based polymer emulsions.

9. The cosmetic composition according to claim 1, which is a sunscreen cosmetic composition.

* * * * *